(12) United States Patent
Li et al.

(10) Patent No.: US 8,786,938 B2
(45) Date of Patent: Jul. 22, 2014

(54) DP-QPSK DEMODULATOR

(71) Applicant: Finisar Corporation, Sunnyvale, CA (US)

(72) Inventors: Huiping Li, Shanghai (CN); Xiaolin Chen, Shanghai (CN); Fan Chen, Shanghai (CN); Fahua Lan, Shanghai (CN)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 13/740,500

(22) Filed: Jan. 14, 2013

(65) Prior Publication Data

US 2014/0133012 A1 May 15, 2014

(30) Foreign Application Priority Data

Nov. 9, 2012 (CN) .......................... 2012 1 0447820

(51) Int. Cl.
*G02F 2/00* (2006.01)

(52) U.S. Cl.
USPC ........................................................ 359/325

(58) Field of Classification Search
USPC ............................................ 359/325; 385/11
See application file for complete search history.

(56) References Cited

U.S. PATENT DOCUMENTS

| 6,781,754 | B2 * | 8/2004 | Zhao ........................ 359/484.07 |
|---|---|---|---|
| 7,173,763 | B2 * | 2/2007 | Du et al. ........................ 359/256 |
| 8,433,204 | B2 * | 4/2013 | Li et al. ........................ 398/188 |
| 8,526,830 | B2 * | 9/2013 | Frisken ........................ 398/202 |
| 2002/0048424 | A1 * | 4/2002 | Zhao .............................. 385/11 |
| 2002/0085252 | A1 * | 7/2002 | Chen et al. ..................... 359/122 |
| 2012/0008951 | A1 * | 1/2012 | Mikami ........................... 398/65 |

\* cited by examiner

*Primary Examiner* — Daniel Petkovsek
(74) *Attorney, Agent, or Firm* — Maschoff Brennan

(57) ABSTRACT

In an embodiment, a demodulator includes first, second, third, fourth and fifth beam displacers, a half waveplate, and a quarter waveplate. The second beam displacer is positioned to receive an output from the first beam displacer. The third beam displacer is positioned to receive an output from the second beam displacer. The half waveplate is positioned to receive an output from the third beam displacer. The fourth beam displacer is positioned to receive an output from the half waveplate. The fifth beam displacer is positioned to receive an output from the fourth beam displacer. The quarter waveplate is positioned between the fourth beam displacer and the fifth beam displacer.

19 Claims, 12 Drawing Sheets

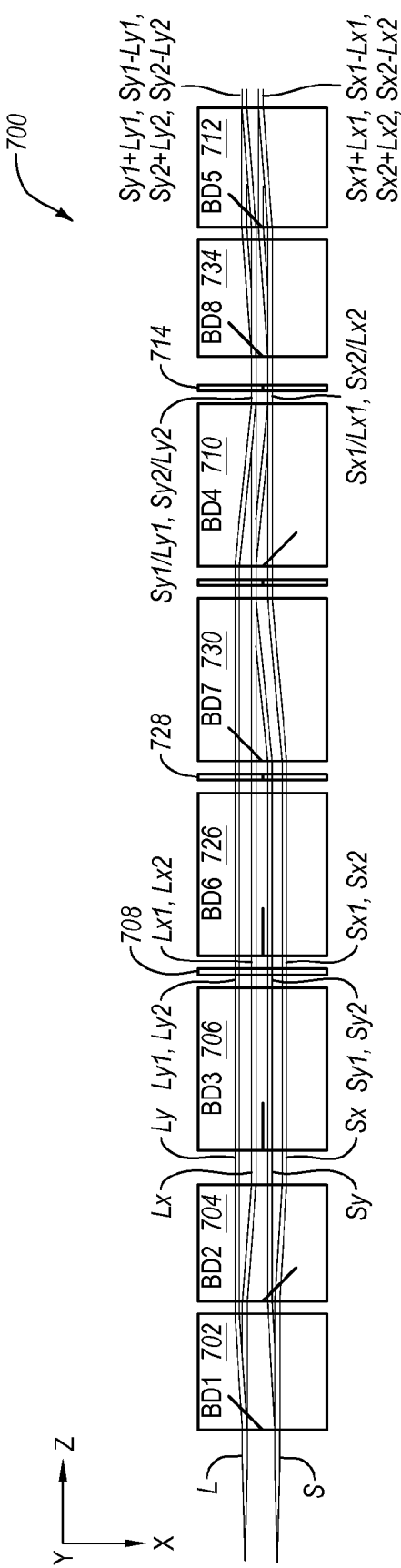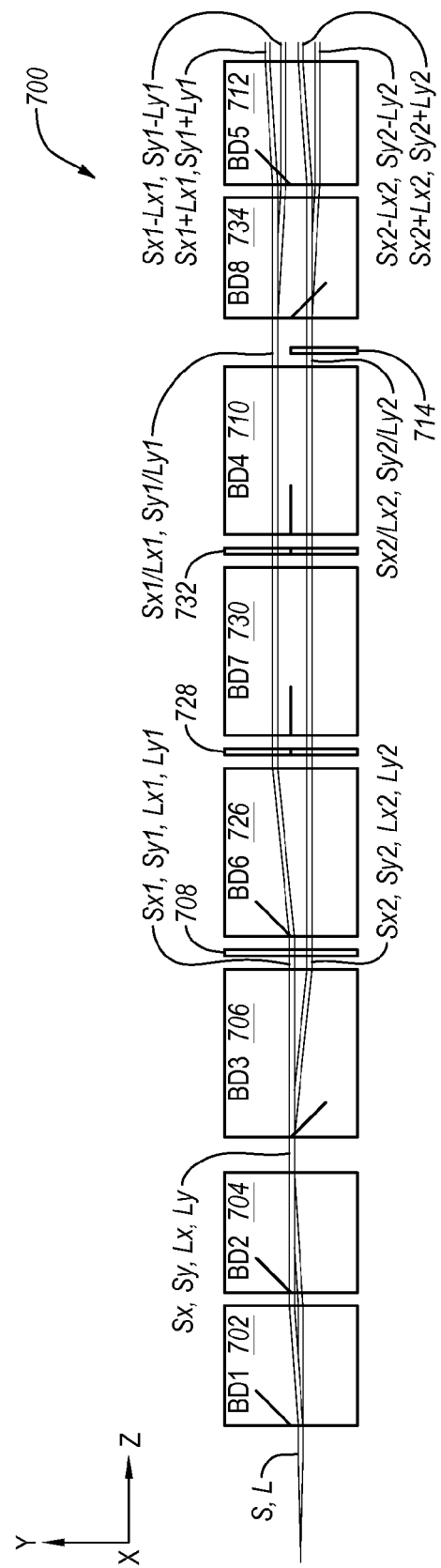

DP-QPSK DEMODULATOR

CROSS-REFERENCE TO RELATED APPLICATIONS

This application claims priority to Chinese Patent Application No. 201210447820.6, filed Nov. 9, 2012 which is incorporated herein by reference in its entirety.

FIELD OF THE INVENTION

Example embodiments relate to a dual-polarization quadrature phase shift keyed (DP-QPSK) demodulator.

BACKGROUND

Currently, 100G Single Mode Fiber ("SMF") and Multi Mode Fiber ("MMF") standards for Ethernet optical link applications are under development. In general, however, on the transmit side, it is presently contemplated that such high speed transmitters will include a Media Access Control ("MAC") component that provides data electrically to an optical transmitter. However, since 100 Gigabits per second is simply too fast for present Complementary Metal Oxide Semiconductor ("CMOS") electrical I/O technology, the 100 Gigabits of electrical data will be provided in several independent electrical lanes.

For instance, perhaps 10 lanes of 10 Gigabits per second of data will be provided from the MAC component to the transmitter. If there were additional overhead used for encoding or error correction, perhaps the data rate for each lane may be increased and/or the number of lanes may be increased. For instance, 66B/64B encoding has been contemplated as being used to encode each lane of 10 Gigabits per second. This would result in each of the 10 lanes of electrical traffic being at an actual data rate of 10.3125 Gigabits per second.

In the transmitter, the 10 lanes of electrical traffic are serialized down to perhaps 4 lanes of optical data, each at a data rate of 25.78125 Gigabits per second, which includes the overhead for 66B/64B encoding. These 4 lanes of optical data may then be multiplexed onto a single fiber using Wavelength Division Multiplexing ("WDM").

Ethernet data may be transported over longer distances by Dense Wavelength Division Multiplexing ("DWDM") systems. Currently, standards are under development for defining the use of DWDM technology for transporting 100G Ethernet data. The standard is referred to as OTU4 and encapsulates the Ethernet data in a payload which is then Forward Error Correction ("FEC") encoded. The resulting fiber data rate is approximately 112 Gigabits per second.

The system (hereinafter called the "100G DWDM OTU4 system") is contemplated as including two primary components, a Forward Error Correction capable MAC layer (called hereinafter an "OTU4/FEC processor") and a 100G DWDM capable transponder. In each of the transmit and receive channels, there are 10 lanes of 11 Gigabits per second data that are communicated using the OIF SFI-S interface specification. There is also an eleventh de-skew lane to align all 10 data lanes for serial data transmission.

One of the modulation technologies considered in this 100G DWDM OTU4 system is Dual-Polarization Quadrature Phase-Shift Keying (called "DP-QPSK" for short). The 112 Gigabit per second data stream is contemplated to be divided into four 28 Gb/s data streams, and modulates both I and Q phases of two orthogonally polarized optical carriers having the same wavelength that are transmitted as a single DP-QPSK signal.

On the receive side, an incoming DP-QPSK signal is separated into two orthogonally polarized optical carriers that are processed by a DP-QPSK demodulator to extract the modulation of the I and Q phases of each of the orthogonally polarized optical signals.

The subject matter claimed herein is not limited to embodiments that solve any disadvantages or that operate only in environments such as those described above. Rather, this background is only provided to illustrate one exemplary technology area where some embodiments described herein may be practiced

BRIEF SUMMARY OF SOME EXAMPLE EMBODIMENTS

Some example embodiments described herein generally relate to demodulators, such as DP-QPSK demodulators.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In an embodiment, a demodulator includes first, second, third, fourth and fifth beam displacers, a half waveplate, and a quarter waveplate. The second beam displacer is positioned to receive an output from the first beam displacer. The third beam displacer is positioned to receive an output from the second beam displacer. The half waveplate is positioned to receive an output from the third beam displacer. The fourth beam displacer is positioned to receive an output from the half waveplate. The fifth beam displacer is positioned to receive an output from the fourth beam displacer. The quarter waveplate is positioned between the fourth beam displacer and the fifth beam displacer.

In another embodiment, an optoelectronic module includes a DP-QPSK demodulator, multiple optical detectors, and a digital signal processor. The DP-QPSK demodulator includes first, second, third, fourth and fifth beam displacers, a half waveplate, and a quarter waveplate. The second beam displacer is positioned to receive an output from the first beam displacer. The third beam displacer is positioned to receive an output from the second beam displacer. The half waveplate is positioned to receive an output from the third beam displacer. The fourth beam displacer is positioned to receive an output from the half waveplate. The fifth beam displacer is positioned to receive an output from the fourth beam displacer. The quarter waveplate is positioned between the fourth beam displacer and the fifth beam displacer. The optical detectors are positioned to receive optical signals output by the DP-QPSK demodulator and are configured to convert the optical signals to electrical signals. The digital signal processor is electrically coupled to respective outputs of the optical detectors.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 7B illustrates a top view of the DP-QPSK demodulator of FIG. 7A;

FIG. 7C illustrates a side view of the DP-QPSK demodulator of FIG. 7A; and

DETAILED DESCRIPTION OF SOME EXAMPLE EMBODIMENTS

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

I. Example Operating Environment

Figure 1:
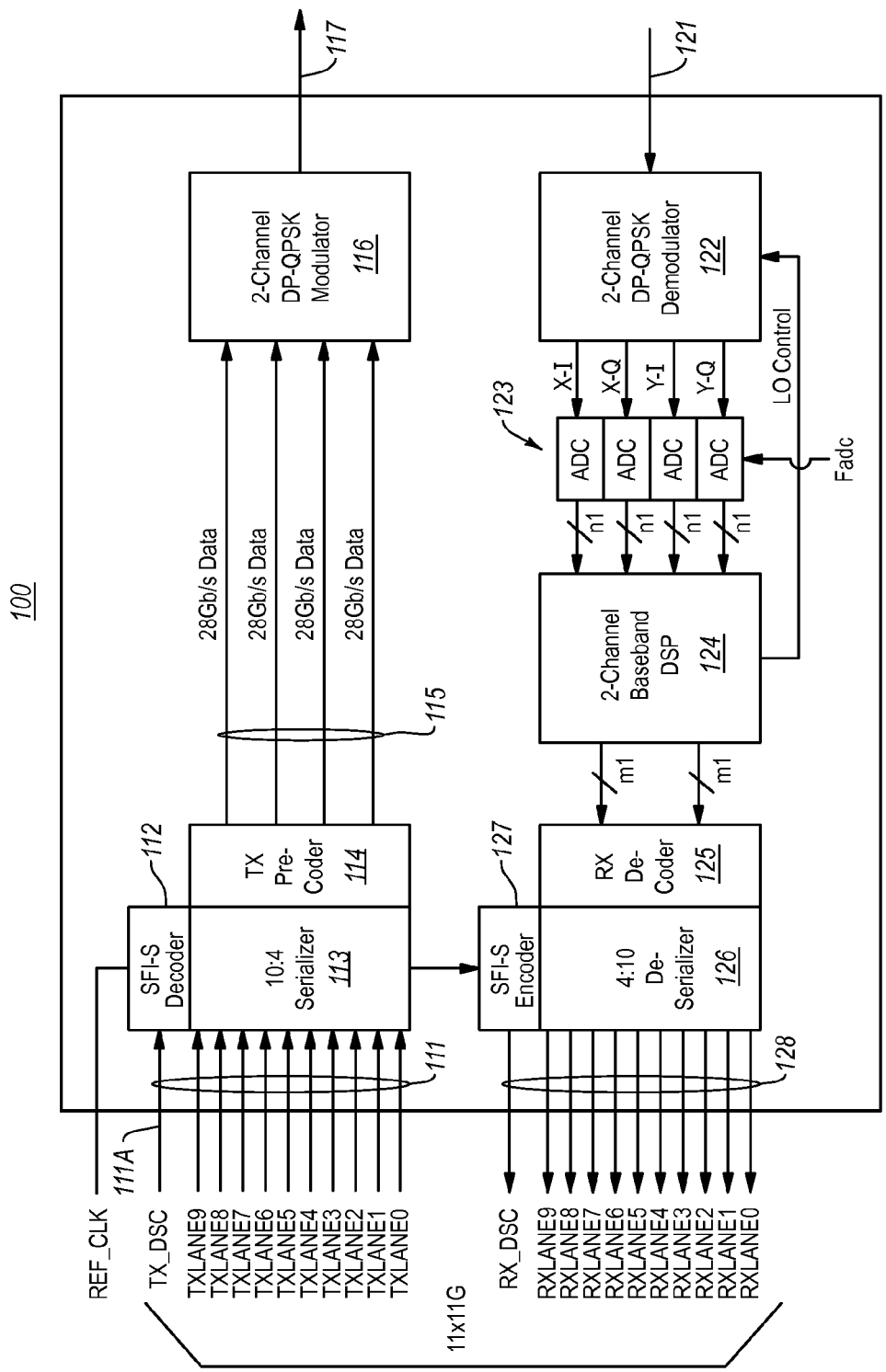
FIG. 1 illustrates a transponder system including a two-channel DP-QPSK modulator and a two-channel DP-QPSK demodulator according to some embodiments.

FIG. 1 illustrates a transponder system 100 (hereinafter "system 100") in which some embodiments disclosed herein may be implemented. The system 100 is discussed below in an example implementation as a 100G DWDM OTU4 system, with the understanding that the system 100 is not confined to implementation as a 100G DWDM OTU4 system, but may be adapted to suit any particular network standard, data rate, or the like. While the system 100 will be described in some detail, the system 100 is not intended to limit the present disclosure and is merely provided as an example of a system in which some embodiments can be implemented. Moreover, in some embodiments, the elements of the system 100 may be packaged as an optoelectronic module.

On the transmit side, the system 100 receives 11 lanes (labeled collectively 111) of 11 Gigabits per second data. One lane 111A is received into an SFI-S decoder 112, and the remaining 10 lanes are received into a 10:4 serializer 113. The SFI-S decoder 112 and the serializer 113 receive a reference clock signal REF_CLK in order to maintain proper timing. The data is reduced to four lanes (labeled collectively 115) of 28 Gigabit per second data after being properly encoded using pre-coder 114. A two-channel DP-QPSK modulator 116 applies DP-QPSK modulation to the four lanes of data to thereby modulate all four lanes of data onto a single optical fiber 117. The modulation is accomplished by using both an X polarization and an orthogonal Y polarization of the optical signal as orthogonal information transport mechanisms, and also by using an in-phase portion and a quadrature-phase portion of each polarization.

On the receive side, a receive optical signal (at a 112 Gigabit per second data rate) is received from an optical fiber 121 into a two-channel DP-QPSK demodulator 122. The received optical signal may be formulated by another network node in the same manner as the optical signal that was transmitted by the DP-QPSK modulator 116. The two-channel DP-QPSK demodulator 122 extracts four components of the optical signal as follows: 1) an in-phase portion of the signal that had X polarization (labeled X-I), 2) a quadrature-phase portion of the signal that had X polarization (labeled X-Q), 3) an in-phase portion of the signal that had Y polarization (labeled Y-I), and 4) a quadrature-phase portion of the signal that had Y polarization (labeled Y-Q). Each of the X and Y polarizations has a bit rate of 56 Gigabits per second, and a symbol rate of 28 Gigasymbols per second, the symbols each representing two bits of information.

The four demodulated data signals X-I, X-Q, Y-I and Y-Q are then quantized by a bank of four Analog-to-Digital Converters ("ADCs") 123. Each ADC quantizes the corresponding demodulated data signal into an n1 bit digital signal, which is then provided to a two-channel baseband Digital Signal Processor ("DSP") 124. A local oscillator control signal "LO Control" is provided by the DSP 124 to the demodulator 122 thereby enabling a coherent receiver architecture. The DSP 124 identifies a corresponding point in an IQ symbol constellation chart for each of the X and Y polarizations, and outputs a corresponding 2 bit sequence for each. The bit sequences are decoded by a decoder 125, after which a 4:10 deserializer 126 and an SFI-S encoder 127 deserializes the bits into 11 lanes (referenced collectively as 128) of SFI-S encoded data, each at approximately 11 Gigabits per second.

Figure 2:
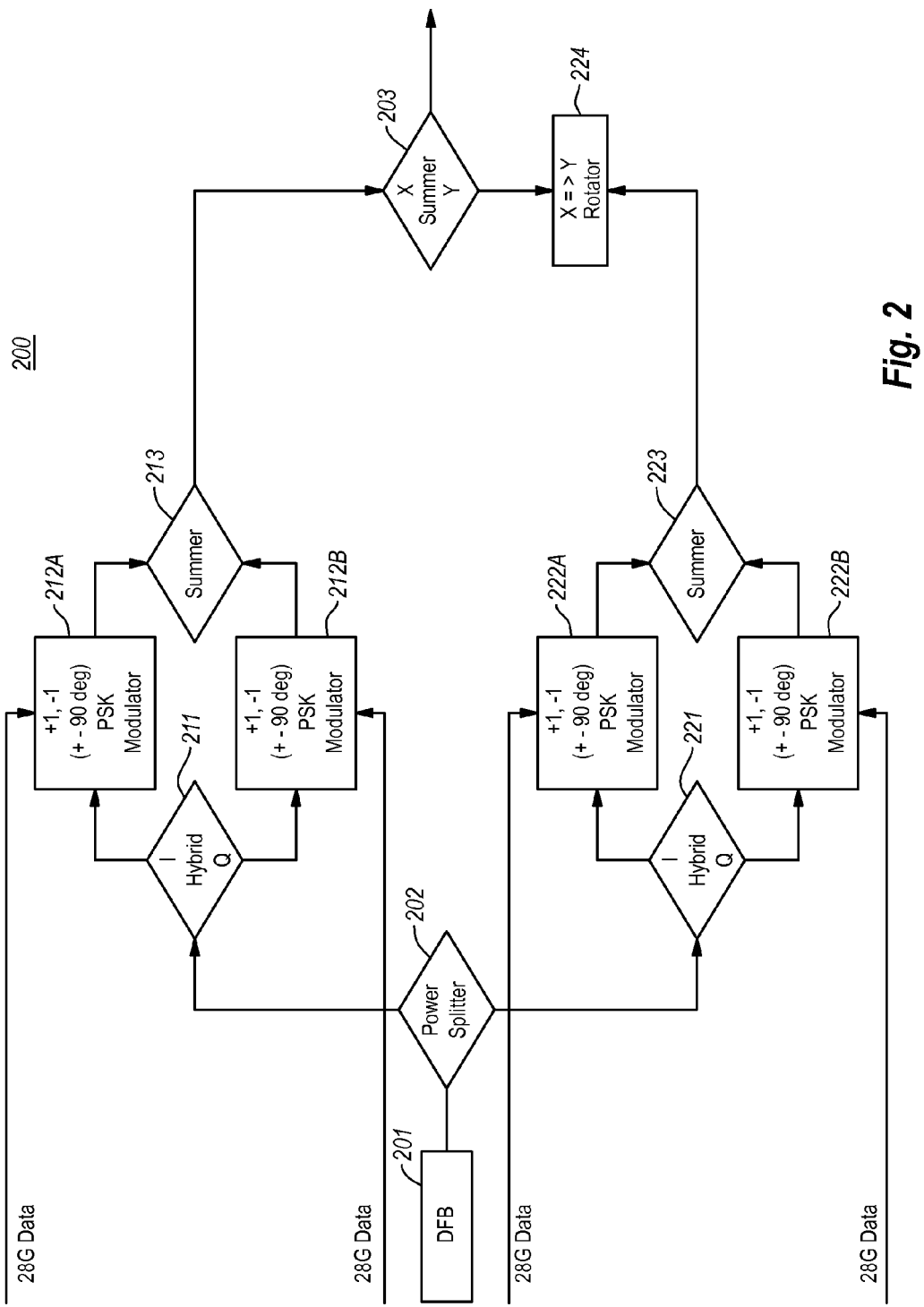
FIG. 2 illustrates an example conceptualization for the two-channel DP-QPSK modulator of the transponder system of FIG. 1 according to some embodiments.

FIG. 2 illustrates an example conceptualization 200 for the two-channel DP-QPSK modulator 116 of FIG. 1. There are two polarization branches in FIG. 2, an X polarization branch represented by the upper circuitry, and a Y polarization branch represented by the lower circuitry. Portions of a local oscillator ("LO") signal provided by a distributed feedback ("DFB") laser 201 or other LO source are fed into each polarization branch via a power splitter 202.

As for the X branch, the continuous waveform from the DFB 201 is fed into a hybrid IQ circuit 211, which essentially causes a continuous in-phase waveform to be provided to an in-phase modulator 212A, and a 90 degree phase shifted version of the continuous waveform (i.e., a quadrature-phase waveform) to be provided to the quadrature-phase modulator 212B. A distinct 28 Gigabit per second signal is fed into each of the in-phase modulator 212A and the quadrature-phase modulator 212B causing appropriate phase shift keying of the optical signal. The in-phase and quadrature-phase keyed optical signals are then summed using optical summer 213.

The Y branch includes hybrid IQ circuit 221, in-phase modulator 222A, quadrature-phase modulator 222B, and summer 223, which may essentially be the same as the respective components 211, 212A, 212B, and 213 of the X branch. However, the Y branch receives its own distinct pair of 28 Gigabits per second signals for appropriate phase shift keying. In addition, an X to Y rotator 224 is provided to represent the summed keyed optical signals output by summer 223 using Y polarization. The X polarized signal and the Y polarized signal are then summed using optical summer 203, after which the summed optical signal may then be transmitted onto an optical fiber.

Figure 3:
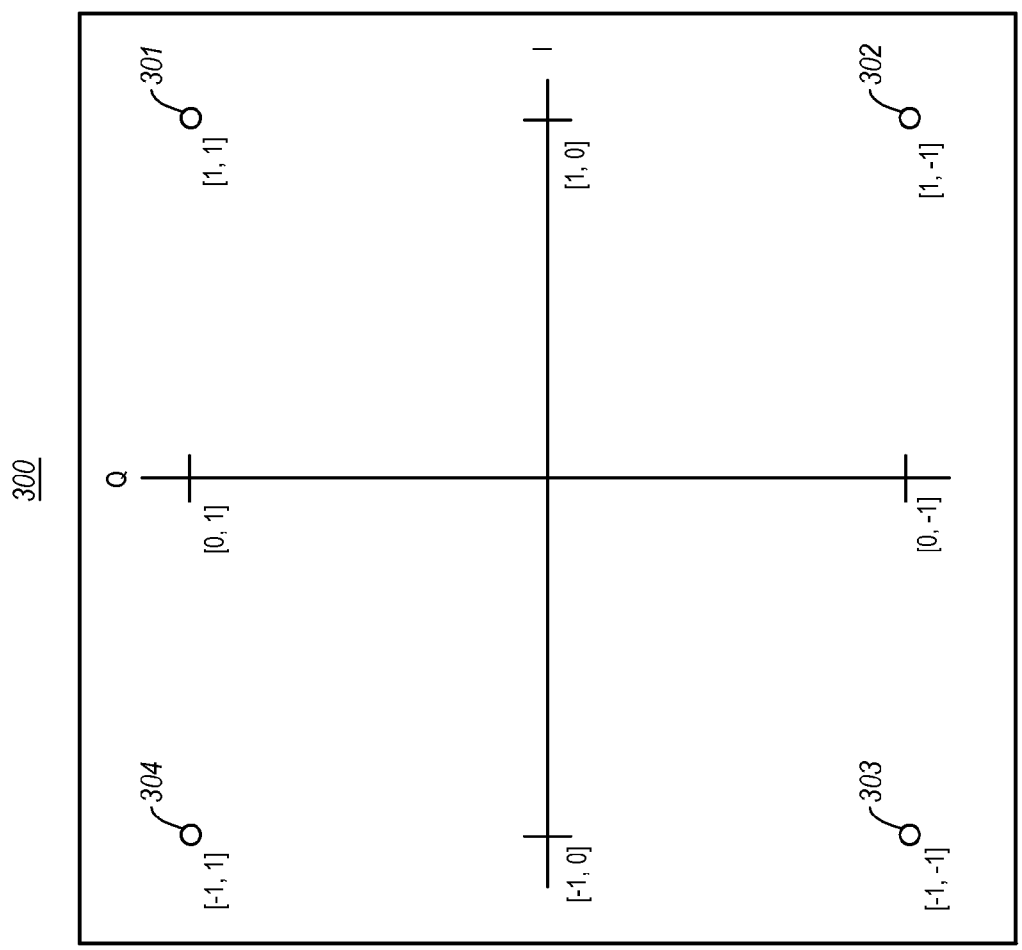
FIG. 3 illustrates a resulting four symbol IQ constellation graph according to some embodiments.

FIG. 3 illustrates a four symbol constellation IQ graph 300 that results from each of the Y polarization signal and the X polarization signal. There are four symbol points 301-304 shown in the IQ graph 300. When a particular signal is received for a certain polarization, the magnitude of the in-phase component and the quadrature-phase component is calculated. Based on that information, the closest symbol point is selected from the IQ graph 300. The corresponding 2 bit symbol (herein ml is equal to 2) is then output to the decoder 125. This is done for each of the X and Y polarization signals.

Figure 4:
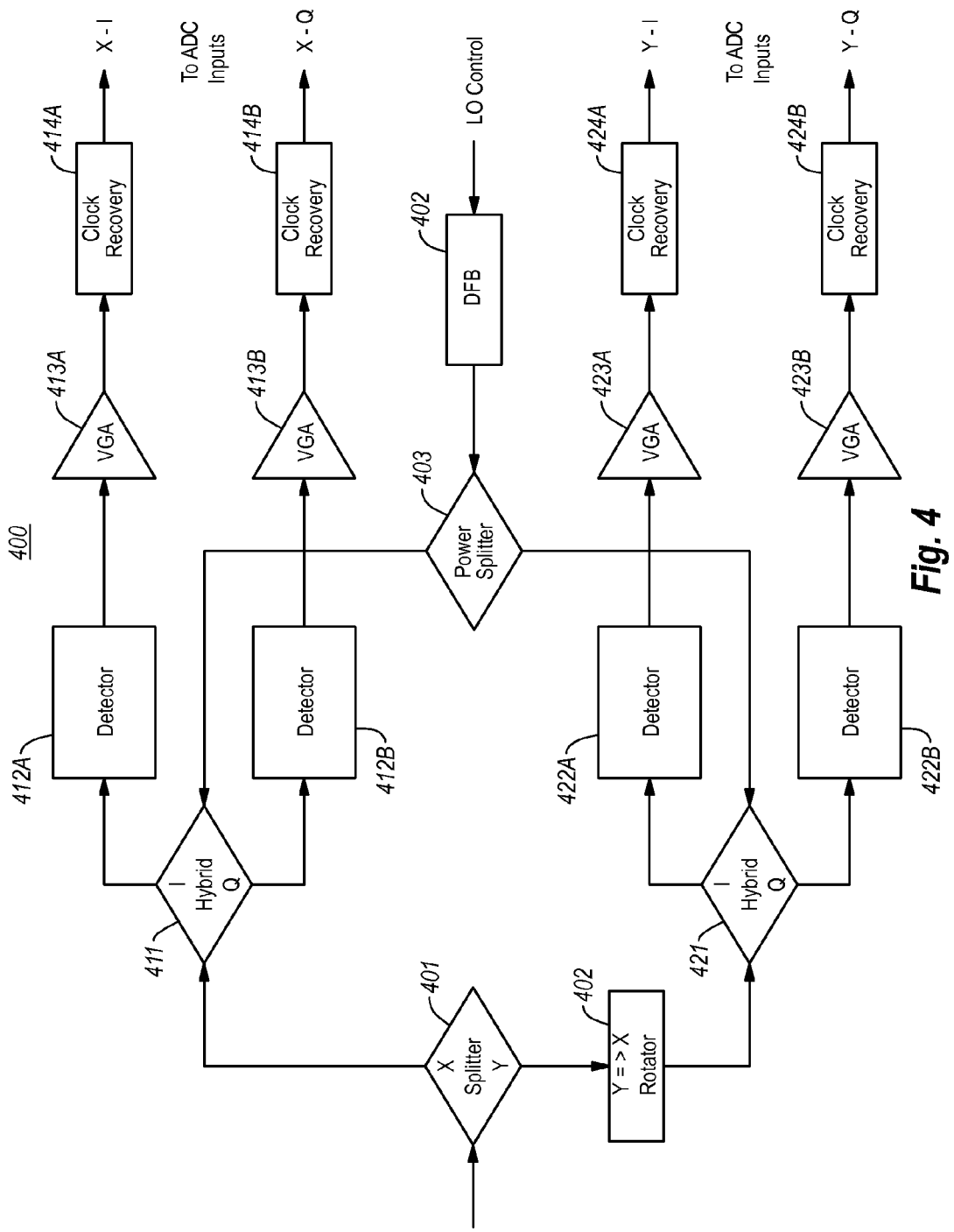
FIG. 4 illustrates an example conceptualization for the two-channel DP-QPSK demodulator of the transponder system of FIG. 1 according to some embodiments.

FIG. 4 illustrates an example conceptualization 400 for the two-channel demodulator 122 of FIG. 1. The optical signal is received into an X Y splitter 401, which provides the X polarized portion of the optical signal to an I/Q hybrid mixer 411 to start the X branch of demodulation. The X Y splitter 401 also provides the Y polarized portion of the optical signal to a Y to X rotator 402, which rotates the polarization of that optical signal to X polarization. That optical signal is provided to an I/Q hybrid mixer 421 to start the Y branch of demodulation.

The X and Y polarization optical signals are mixed in I/Q Hybrids 411 and 421 respectively with a continuous waveform LO signal provided by a DFB laser 402 via a power splitter 403 with the timing of the continuous waveform controlled by an LO Control signal. The resulting mixed signals are then provided to corresponding optical detectors 412A, 412B, 422A and 422B. Each corresponding electrical signal may be adjusted to a normalized level by respective Variable Gain Amplifiers ("VGAs") 413A, 413B 423A and 423B, after which they are subjected to clock recovery 414A, 414B, 424A and 424B. The clock recovery elements 414A, 414B, 424A and 424B should be viewed as functional transformations only, since the clock recovery may be provided for all channels using a single clock recovery circuit. This results in signals X-I, X-Q, Y-I and Y-Q described in FIG. 1. The VGA and clock recovery performance may be improved by using error signals derived in a corresponding two-channel Baseband DSP, such as the two-channel Baseband DSP 124 of FIG. 1.

The optical detectors 412A, 412B, 422A, 422B of FIG. 4 may each be implemented as a single-ended optical-to-electrical (hereinafter "opto-electrical") converter. Examples of suitable opto-electrical converters include, for instance, positive-intrinsic-negative ("PIN") photodiodes, or the like. Alternatively, each of optical detectors 412A, 412B, 422A, 422B may include a pair of balanced opto-electrical converters.

II. Example Receive System

Figure 5A:
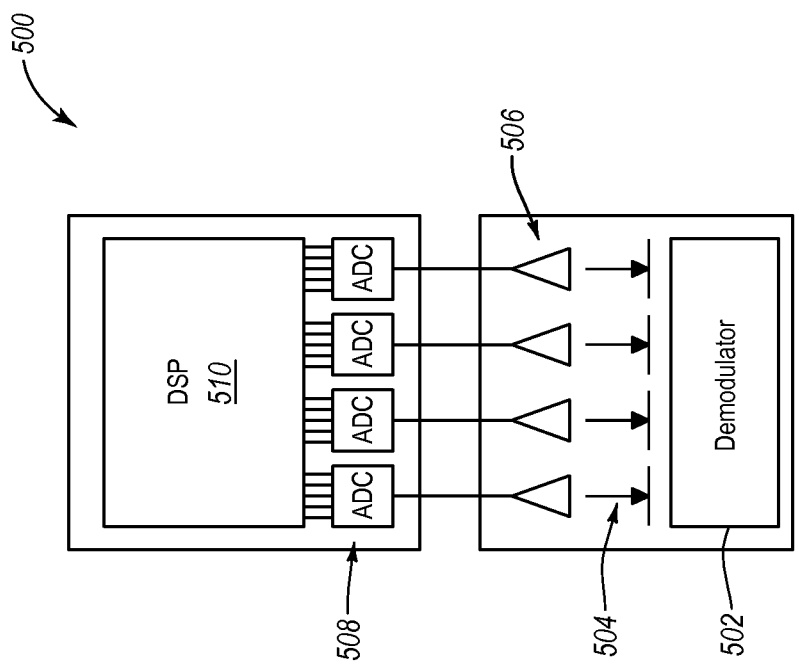
FIGS. 5A-5B illustrate aspects of a receive system including a DP-QPSK demodulator according to some embodiments.

FIG. 5A illustrates a receive system 500 according to some embodiments. The receive system 500 may be implemented in a transponder system, such as the system 100 of FIG. 1. In particular, the receive system 500 may correspond to at least a portion of the receive side of system 100, including the two-channel DP-QPSK demodulator 122, ADCs 123 and two-channel Baseband DSP 124.

As shown, the receive system 500 includes DP-QPSK demodulator 502, a plurality of optical detectors 504, a plurality of amplifiers 506, a plurality of ADCs 508, and a DSP 510. The optical detectors 504 may include, for instance, four single-ended opto-electrical converters, or eight balanced opto-electrical converters arranged in pairs, or any other suitable configuration.

Figure 5B:
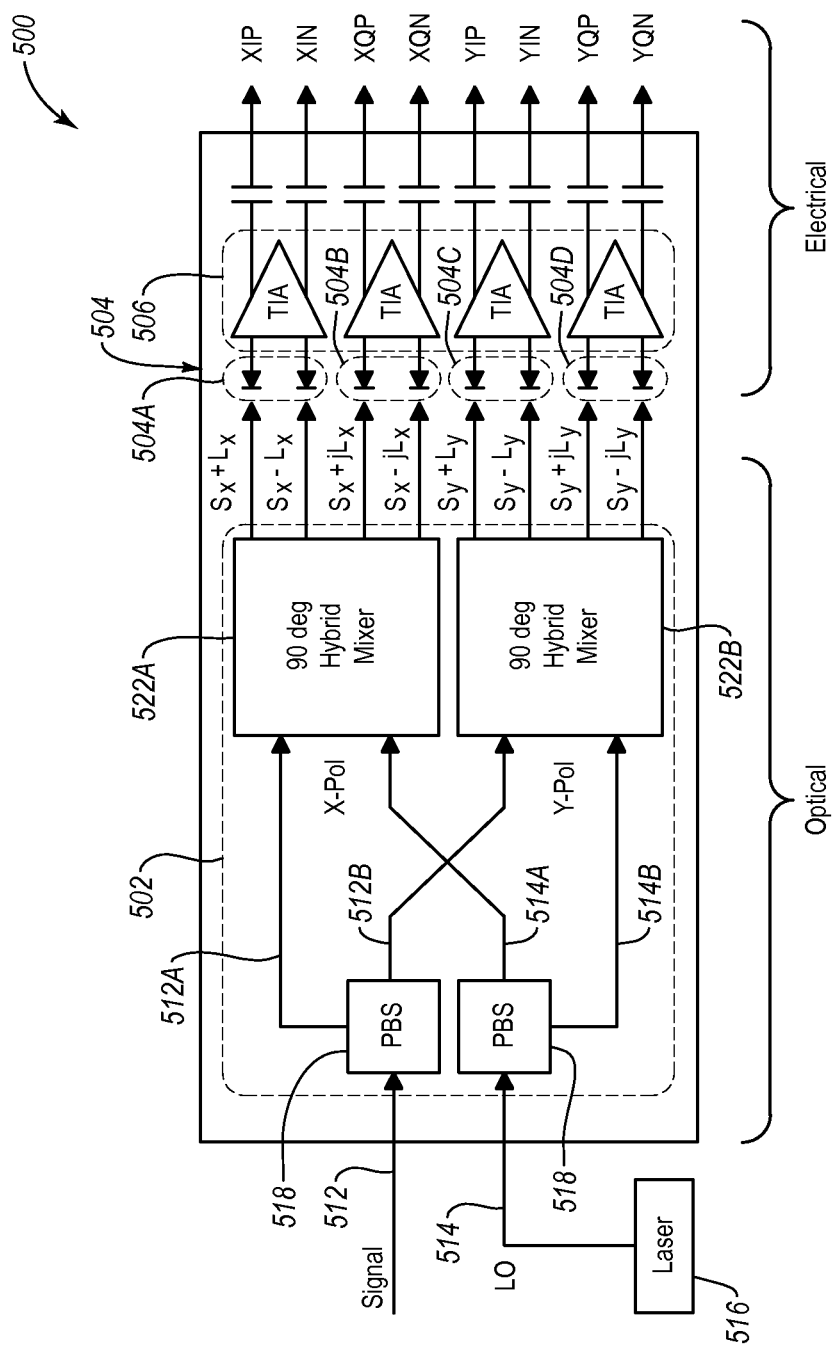

Additional details regarding example embodiments of the demodulator 502, optical detectors 504 and amplifiers 506 of the receive system 500 are provided in FIG. 5B. As illustrated in FIG. 5B, the demodulator 502 is configured to receive a DP-QPSK optical signal 512 and an LO optical signal 514 generated by a local oscillator 516 such as a DFB laser. Each of the DP-QPSK optical signal 512 and the LO optical signal 514 is split into two components by one or more polarization beam splitters ("PBS") 518.

In more detail, the DP-QPSK optical signal 512 is split into a first component 512A having a first polarization state (e.g., X polarization) and a second component 512B having a second polarization state (e.g., Y polarization) that is orthogonal to the first polarization state. The first component 512A is provided to a first 90 degree hybrid mixer 522A. The second component 512B is provided to a second 90 degree hybrid mixer 522B.

The LO optical signal 514 is also split into first and second components 514A, 514B that are respectively provided to the first and second 90 degree hybrid mixers 522A, 522B.

In general, the first 90 degree hybrid mixer 522A is configured to perform four 90 degree phase stepped interferences between the first component 512A of the DP-QPSK optical signal 512 and the first component 514A of the LO optical signal 514. In the illustrated embodiment, the first 90 degree hybrid mixer 522A is configured to output four interference signals, including two in-phase signals $S_x+L_x$ and $S_x-L_x$, and two quadrature-phase signals $S_x+jL_x$ and $S_x-jL_x$. The "x" subscript denotes that these interference signals are associated with the X-polarized first component 512A of the DP-QPSK optical signal 512.

The interference signals $S_x+L_x$, $S_x-L_x$, $S_x+jL_x$ and $S_x-jL_x$ output by the first 90 degree hybrid mixer 522A are converted to electrical signals by two pairs 504A, 504B of balanced opto-electrical converters included in the optical detectors 504. Alternatively, the first 90 degree hybrid mixer 522A may be configured to output two interference signals, including a single in-phase signal and a single quadrature-phase signal, and provide the two interference signals to two single-ended opto-electrical converters (not shown) included in the optical detectors 504.

Analogously, the second 90 degree hybrid mixer 522B is configured to perform four 90 degree phase stepped interferences between the second component 512B of the DP-QPSK optical signal 512 and the second component 514B of the LO optical signal 514. In the illustrated embodiment, the second 90 degree hybrid mixer 522B is configured to output four interference signals, including two in-phase signals $S_y+L_y$ and $S_y-L_y$, and two quadrature-phase signals $S_y+jL_y$ and $S_y-jL_y$. The "y" subscript denotes that these interference signals are associated with the Y-polarized second component 512B of the DP-QPSK optical signal 512.

The interference signals $S_y+L_y$, $S_y-L_y$, $S_y+jL_y$ and $S_y-jL_y$ output by the second 90 degree hybrid mixer 522B are converted to electrical signals by two pairs 504C, 504D of balanced opto-electrical converters included in the optical detectors 504. Alternatively, the second 90 degree hybrid mixer 522B may be configured to output two interference signals, including a single in-phase signal and a single quadrature-phase signal, and provide the two interference signals to two single-ended opto-electrical converters (not shown) included in the optical detectors 504.

III. First Embodiment of a DP-QPSK Demodulator

Figure 6A:
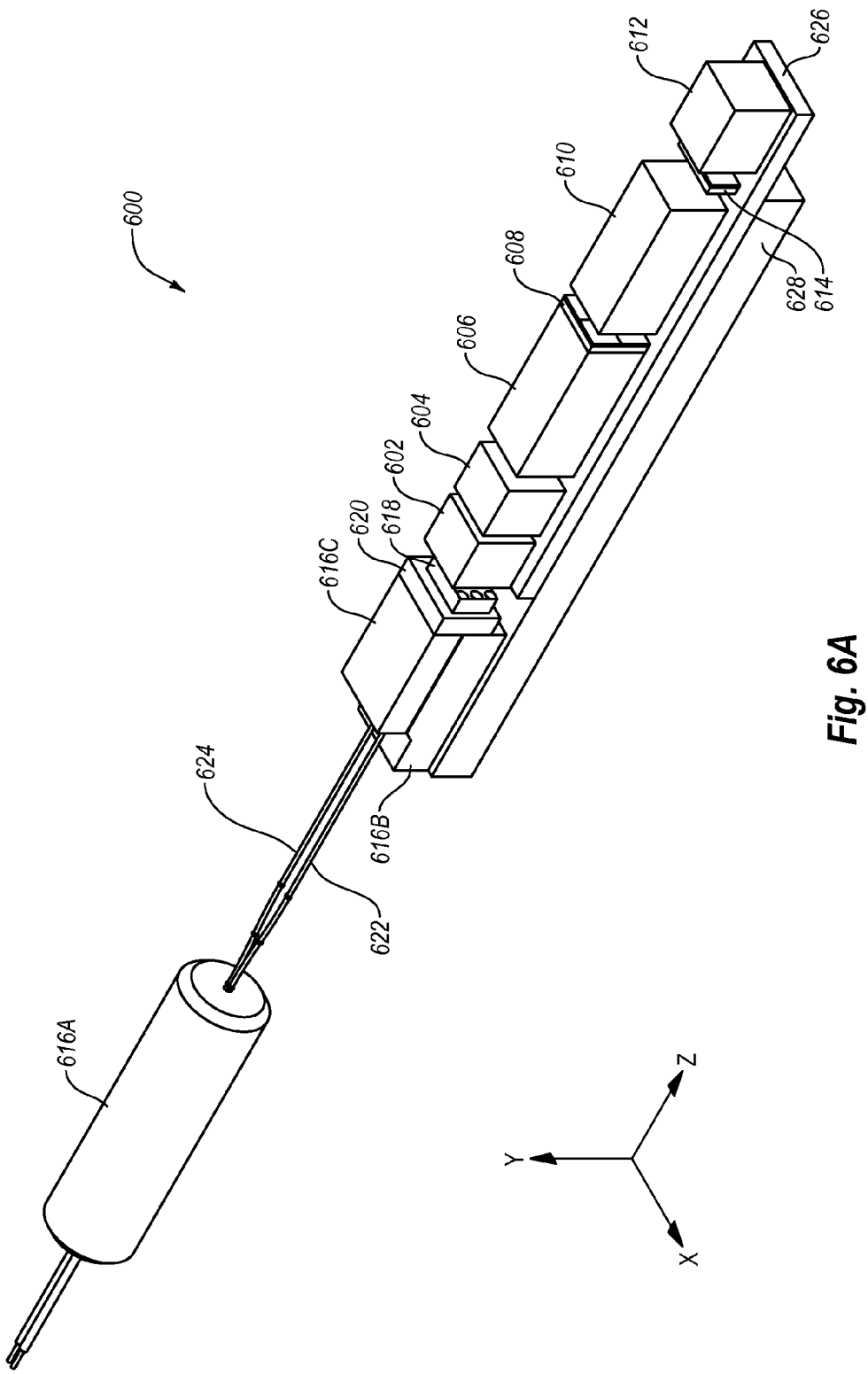
FIG. 6A illustrates a perspective view of an example DP-QPSK demodulator such as may be implemented in the transponder system of FIG. 1.
Figure 6B:
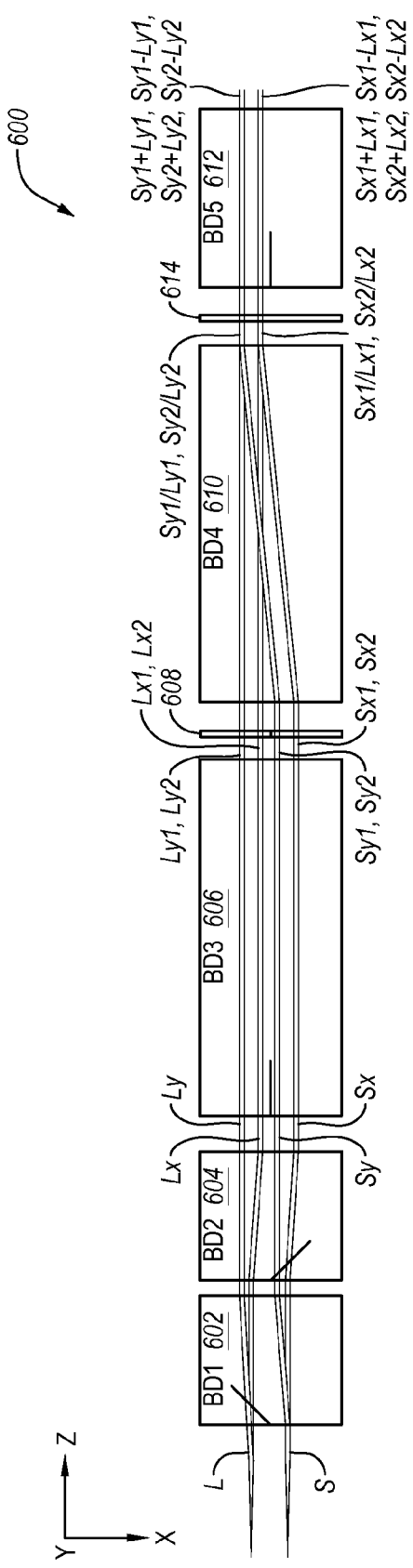
FIG. 6B illustrates a top view of the DP-QPSK demodulator of FIG. 6A.
Figure 6C:
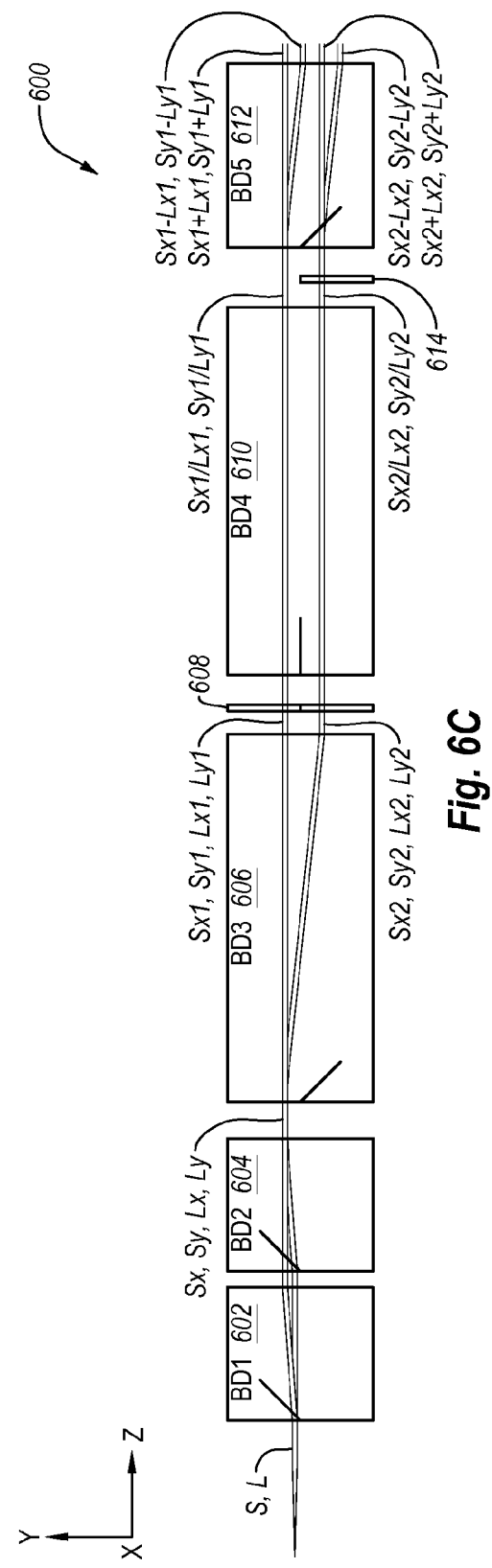
FIG. 6C illustrates a side view of the DP-QPSK demodulator of FIG. 6A.
Figure 6D:
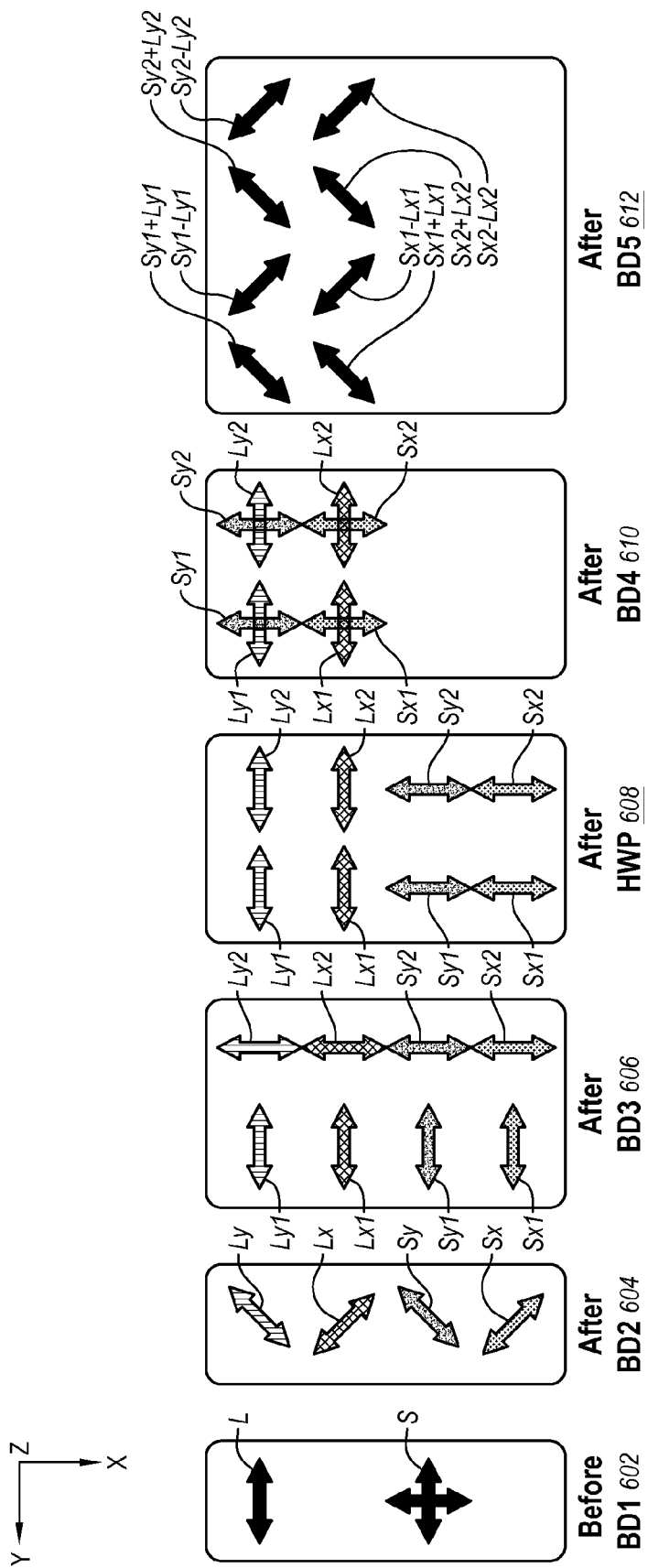
FIG. 6D illustrates various polarization states associated with various signals at various points during passage through the DP-QPSK demodulator of FIGS. 6A-6C.

Reference will next be made to FIGS. 6A-6D to describe a first example embodiment of a DP-QPSK demodulator 600. FIG. 6A illustrates a perspective view of the DP-QPSK demodulator 600 (hereinafter "demodulator 600"), which demodulator may be implemented in the transponder system 100 of FIG. 1 and/or the receive system 500 of FIGS. 5A-5B. For example, the demodulator 600 may correspond to the demodulator 122 of FIG. 1 or the demodulator 502 of FIGS. 5A-5B. FIG. 6B illustrates a top view of the demodulator 600 of FIG. 6A. FIG. 6C illustrates a side view of the demodulator 600 of FIG. 6A. FIG. 6D illustrates various polarization states associated with various signals at various points during passage through the demodulator 600 of FIGS. 6A-6C.

In the illustrated embodiment, the demodulator 600 includes a first beam displacer (BD) ("BD1" in FIGS. 6B-6D) 602, a second BD ("BD2" in FIGS. 6B-6D) 604, a third BD ("BD3" in FIGS. 6B-6D) 606, a half waveplate (HWP) 608, a fourth BD ("BD4" in FIGS. 6B-6D) 610, a fifth BD ("BD5" in FIGS. 6B-6D) 612 and a quarter waveplate (QWP) 614. The second BD 604 is positioned to receive an output from the first BD 602. The third BD 606 is positioned to receive an output from the second BD 604. The HWP 608 is positioned to receive an output from the third BD 606 and in some embodiments may be coupled to the third BD 606. The fourth BD 610 is positioned to receive an output from the HWP 608. The fifth BD 612 is positioned to receive an output from the fourth BD 610. The QWP 614 is positioned between the fourth BD 610 and the fifth BD 612.

FIG. 6A additionally includes a set of arbitrarily defined reference axes x, y, z to provide a frame of reference. The reference axes x, y, z are also provided in FIGS. 6B-6D as an aid in understanding the orientations of the views depicted in FIGS. 6B-6D with respect to the view of FIG. 6A.

In some embodiments, each of the first BD 602, the second BD 604, the third BD 606, the fourth BD 610 and the fifth BD 612 may include, but is not limited to, Birefringent crystal such as YVO4.

As illustrated in FIG. 6A, the demodulator 600 may optionally further include various components 616A-616C that collectively form a fiber array with feedthrough (hereinafter "fiber array with feedthrough 616"). The fiber array with feedthrough 616 includes a feedthrough tube 616A, a V-groove alignment guide 616B, and a lid 616C. In some embodiments, a lens array 618 may be positioned between the fiber array with feedthrough 616 and the first BD 602, and a spacer 620 may be positioned between the fiber array with feedthrough 616 and the lens array 618. First and second optical fibers 622, 624 extending from the feedthrough tube 616A may respectively provide an input DP-QPSK optical signal S (hereinafter "optical signal S") and a local oscillator signal L (hereinafter "LO signal L"), both of which may be transmitted through the spacer 620 and lens array 618 to the first BD 602. The first optical fiber 622 may include single mode (SM) fiber. The second optical fiber 624 may include polarization maintaining (PM) fiber. The fiber array with feedthrough 616, the spacer 620 and the lens array 618 may collectively form a collimator for the optical signal S and LO signal L received from the first and second optical fibers 622, 624.

Optionally, the demodulator 600 further includes a first substrate 626 and a second substrate 628. The HWP 608, QWP 614, and first, second, third, fourth and fifth BDs 602, 604, 606, 610, 612 may be mounted on, formed on, or otherwise coupled to the first substrate 626. At least a portion of the fiber array with feedthrough 616 and the first substrate 626 may be mounted on, formed on, or otherwise coupled to the second substrate 628. Each of the first and second substrates 626, 628 may include, but is not limited to, fused silica or other suitable material(s).

As best seen in FIGS. 6B-6C, the optical signal S enters the first BD 602 followed by the second BD 604. The first and second BDs 602, 604 cooperate to divide the optical signal S into components Sx and Sy having orthogonal X and Y polarization states. Analogously, the LO signal L enters the first BD 602 followed by the second BD 604 and is divided into components Lx and Ly having orthogonal X and Y polarization states. The polarization states of the components Sx, Sy, Lx and Ly at the output of the second BD 604 are illustrated in FIG. 6D at "After BD2 604" and are labeled with the same labels "Sx", "Sy", "Lx" and "Ly" as the corresponding components Sx, Sy, Lx and Ly for convenience. In like manner, the polarization states of various optical signals or components and/or portions thereof at various locations of the demodulator 600 are labeled in FIG. 6D with the same labels as used to identify the corresponding optical signals or components and/or portions thereof.

A single one of the components Sx, Sy, Lx, Ly is visible in the side view of FIG. 6C at the output of the second BD 604. It is appreciated, however, with the benefit of the present disclosure, that all four of the components Sx, Sy, Lx, Ly exit the second BD 604 in a same plane that is substantially parallel to the x-z plane such that only one of the components Sx, Sy, Lx, Ly is visible at the output of the second BD 604 in the view of FIG. 6C. The component illustrated as exiting the second BD 604 has been labeled as "Sx, Sy, Lx, Ly" in FIG. 6C to indicate that all four components Sx, Sy, Lx, Ly exit the second BD 604 at about the same height in the y-direction, although generally spaced apart from each other in the x direction as illustrated in FIG. 6B.

A similar labeling convention has been used throughout FIGS. 6B and 6C where only one of multiple components or subcomponents is visible due to the orientation of the plane of the corresponding Figure with respect to a plane in which the multiple components or subcomponents are disposed, e.g., where the plane of the Figure is perpendicular to a plane in which the multiple components or subcomponents are disposed. In particular, wherever a component or subcomponent is labeled in FIG. 6B or 6C with a string of reference names (e.g., Sx, Sy, Lx, Ly, etc.) separated by commas, this indicates that the components or subcomponents identified by the comma-separated reference names are disposed in a plane that is substantially perpendicular to the x-z plane for FIG. 6B, or to the y-z plane for FIG. 6C.

With continued reference to FIGS. 6B-6D, the components Sx, Sy, Lx and Ly output by the second BD 604 enter the third BD 606. The third BD 606 is configured to split each of the components Sx, Sy, Lx and Ly into two orthogonally polarized subcomponents. Specifically, and with combined reference to FIGS. 6B-6D, the third BD 606 splits the component Sx into orthogonally polarized subcomponents Sx1 and Sx2; splits the component Sy into orthogonally polarized subcomponents Sy1 and Sy2; splits the component Lx into orthogonally polarized subcomponents Lx1 and Lx2; and splits the component Ly into orthogonally polarized subcomponents Ly1 and Ly2. Each of the components Sx, Sy, Lx, Ly thus exits the second BD 604 and enters the third BD 606 with the diagonal polarizations illustrated in FIG. 6D, and is split into the two components Sx1 and Sx2, Sy1 and Sy2, Lx1 and Lx2, and Ly1 and Ly2 having vertical polarization (for Sx1, Sy1, Lx1 and Ly1) or horizontal polarization (for Sx2, Sy2, Lx2 and Ly2) as also illustrated in FIG. 6D.

In some embodiments, vertical polarization refers to polarization oriented in a direction substantially parallel to the y axis while horizontal polarization refers to polarization oriented in a direction substantially parallel to the x axis. Thus, notwithstanding the orientation of the polarizations of Sx1, Sy1, Lx1 and Ly2 in FIG. 6D being oriented side-to-side in the view of 6D, these polarizations are referred to as vertical polarizations insofar as they are substantially parallel to the y axis. Similarly, notwithstanding the orientation of the polarizations of Sx2, Sy2, Lx2 and Ly2 in FIG. 6D being oriented top-to-bottom in the view of 6D, these polarizations are referred to as horizontal polarizations insofar as they are substantially parallel to the x axis. Diagonal polarization refers to any polarization parallel to the x-y plane that is oriented at about plus or minus 45 degrees from a line parallel to the x axis. The foregoing naming convention of vertical, horizontal and diagonal polarization with respect to the arbitrarily defined axes x, y, z in FIGS. 6A-6D is similarly applied with respect to FIGS. 7A-7D.

The subcomponents Sx1, Sx2, Sy1, Sy2, Lx1, Lx2, Ly1 and Ly2 output by the third BD 606 are transmitted through the HWP 608. The HWP 608 may have four portions, including a first portion through which subcomponents Sx1 and Sy1 are transmitted, a second portion through which subcomponents Sx2 and Sy2 are transmitted, a third portion through which subcomponents Lx1 and Ly1 are transmitted and a fourth portion through which subcomponents Lx2 and Ly2 are transmitted. The first and the fourth portion of the HWP 608 may be oriented at about 45 degrees, while the second and the third portion of the HWP 608 may be oriented at about 0 degrees. As used herein, the term "oriented at" as applied to a waveplate such as the HWP 608 refers to the orientation of the optical axis angle of a corresponding waveplate crystal with respect to the horizontal line.

The first portion of the HWP 608 may be configured to rotate the polarization of signals with vertical polarization, such as the subcomponents Sx1 and Sy1, to horizontal polarization, while the second portion of HWP 608 may not rotate the polarization of signals with horizontal polarization, such as the subcomponents Sx2 and Sy2. The horizontal polarizations of the subcomponents Sx1, Sx2, Sy1 and Sy2 after the HWP 608 are illustrated in FIG. 6D. The fourth portion of the HWP 608 may be configured to rotate the polarization of signals with horizontal polarization, such as the subcomponents Lx2 and Ly2, to vertical polarization, while the third portion of HWP 608 may not rotate the polarization of signals with vertical polarization, such as the subcomponents Lx1 and Ly1. The vertical polarizations of the subcomponents Lx1, Lx2, Ly1 and Ly2 after the HWP 608 are illustrated in FIG. 6D. Accordingly, and after the HWP 608, all of the subcomponents Sx1, Sx2, Sy1 and Sy2 of the optical signal S are horizontally polarized, while all of the subcomponents Lx1, Lx2, Ly1 and Ly2 of the LO signal L are vertically polarized.

The subcomponents Sx1, Sx2, Sy1, Sy2, Lx1, Lx2, Ly1 and Ly2 output by the HWP 608 enter the fourth BD 610. The fourth BD 610 is configured to pair each of the subcomponents Sx1, Sx2, Sy1, Sy2 of the optical signal S with a corresponding one of the subcomponents Lx1, Lx2, Ly1, Ly2 of the LO signal L such that an output of the fourth BD 610 includes four signal pairs, including Sx1/Lx1, Sx2/Lx2, Sy1/Ly1, and Sy2/Ly2. In the illustrated embodiment, the pairing is accomplishing by redirecting a signal path of each of the subcomponents Sx1, Sx2, Sy1, Sy2 to coincide with a signal path of a corresponding one of the subcomponents Lx1, Lx2, Ly1, Ly2 at the output of the fourth BD 610. In other embodiments, the pairing may be accomplishing by redirecting a signal path of each of the subcomponents Lx1, Lx2, Ly1, Ly2 to coincide with a signal path of a corresponding one of the subcomponents Sx1, Sx2, Sy1, Sy2 at the output of the fourth BD 610, or by redirecting signal paths of each half of a pair as necessary so that they coincide at the output of the fourth BD 610.

More particularly, and in the illustrated embodiment, the fourth BD 610 redirects a signal path of the subcomponent Sx1 to coincide with a signal path of the subcomponent Lx1 at the output of the fourth BD 610 to generate first signal pair Sx1/Lx1. Additionally, the fourth BD 610 redirects a signal path of the subcomponent Sx2 to coincide with a signal path of the subcomponent Lx2 at the output of the fourth BD 610 to generate second signal pair Sx2/Lx2. Additionally, the fourth BD 610 redirects a signal path of the subcomponent Sy1 to coincide with a signal path of the subcomponent Ly1 at the output of the fourth BD 610 to generate third signal pair Sy1/Ly1. Additionally, the fourth BD 610 redirects a signal path of the subcomponent Sy2 to coincide with a signal path of the subcomponent Ly2 at the output of the fourth BD 610 to generate fourth signal pair Sy2/Ly2.

After the fourth BD 610, the second signal pair Sx2/Lx2 passes through the QWP 614. The fourth signal pair Sy2/Ly2 also passes through the QWP 614, whereas the first signal pair Sx1/Lx1 and the third signal pair Sy1/Ly1 do not. In at least some example embodiments, the QWP 614 is oriented at about 0 degrees. Accordingly, the QWP 614 may be configured to introduce a 90 degree phase difference between the first signal pair Sx1/Lx1 and the second signal pair Sx2/Lx2, and may be further configured to introduce a 90 degree phase difference between the third signal pair Sy1/Ly1 and the fourth signal pair Sy2/Ly2.

Next, the signal pairs Sx1/Lx1, Sx2/Lx2, Sy1/Ly1, and Sy2/Ly2 enter the fifth BD 612. The fifth BD 612 divides the subcomponent Sx1 into first and second portions on separate signal paths having diagonal polarizations that are orthogonal to each other. The first and second portions of the subcomponent Sx1 may have substantially equal power in some embodiments. Similarly, the fifth BD 612 divides the subcomponent Lx1 traveling on the same signal path as the subcomponent Sx1 into first and second portions having diagonal polarizations that are orthogonal to each other. The first and second portions of the subcomponent Lx1 travel on the same separate signal paths as the first and second portions of the subcomponent Sx1 and may have substantially equal power in some embodiments.

The first portion of the subcomponent Sx1 may constructively interfere in the fifth BD 612 with the first portion of the subcomponent Lx1 traveling on the same signal path as the first portion of the subcomponent Sx1 to produce in-phase signal Sx1+Lx1. The second portion of the subcomponent Sx1 may destructively interfere in the fifth BD 612 with the second portion of the subcomponent Lx1 traveling on the same signal path as the second portion of the subcomponent Sx1 to produce in-phase signal Sx1−Lx1. In-phase signals Sx1+Lx1 and Sx1−Lx1, which may correspond to in-phase signals $S_x+L_x$ and $S_x-L_x$ in FIG. 5B, may be provided to a pair of balanced opto-electrical converters, such as the pair 504A of balanced opto-electrical converters of FIG. 5B.

In an analogous manner, the fifth BD 612 divides each of the subcomponents Sx2, Sy1 and Sy2 into two portions having diagonal polarizations that are orthogonal to each other and are on separate signal paths. The fifth BD 612 also divides each of the subcomponents Lx2, Ly1 and Ly2 into two portions having diagonal polarizations that are orthogonal to each other and are on the same separate signal paths, respectively, as the corresponding portions of subcomponents Sx2, Sy1 and Sy2. Then the portions of the subcomponents Sx2, Sy1 and Sy2 constructively and destructively interfere with the respective portions of the subcomponents Lx2, Ly1 and Ly2.

In particular, a first portion of the subcomponent Sx2 may constructively interfere in the fifth BD 612 with a first portion of the subcomponent Lx2 traveling on the same signal path as the first portion of the subcomponent Sx2 to produce quadrature phase signal Sx2+Lx2. Additionally, a second portion of the subcomponent Sx2 may destructively interfere in the fifth BD 612 with a second portion of the subcomponent Lx2 traveling on the same signal path as the second portion of the subcomponent Sx2 to produce quadrature phase signal Sx2−Lx2. Quadrature phase signals Sx2+Lx2 and Sx2−Lx2, which may correspond to quadrature phase signals $S_x+jL_x$ and $S_x-jL_x$ in FIG. 5B, may be provided to a pair of balanced opto-electrical converters, such as the pair 504B of balanced opto-electrical converters of FIG. 5B.

Analogously, a first portion of the subcomponent Sy1 may constructively interfere in the fifth BD 612 with a first portion of the subcomponent Ly1 traveling on the same signal path as the first portion of the subcomponent Sy1 to produce in-phase signal Sy1+Ly1. Additionally, a second portion of the subcomponent Sy1 may destructively interfere in the fifth BD 612 with a second portion of the subcomponent Ly1 traveling on the same signal path as the second portion of the subcomponent Sy1 to produce in-phase signal Sy1−Ly1. In-phase signals Sy1+Ly1 and Sy1−Ly1, which may correspond to in-phase signals $S_y+L_y$ and $S_y-L_y$ in FIG. 5B, may be provided to a pair of balanced opto-electrical converters, such as the pair 504C of balanced opto-electrical converters of FIG. 5B.

Analogously, a first portion of the subcomponent Sy2 may constructively interfere in the fifth BD 612 with a first portion of the subcomponent Ly2 traveling on the same signal path as the first portion of the subcomponent Sy2 to produce quadrature phase signal Sy2+Ly2. Additionally, a second portion of the subcomponent Sy2 may destructively interfere in the fifth BD 612 with a second portion of the subcomponent Ly2 traveling on the same signal path as the second portion of the subcomponent Sy2 to produce quadrature phase signal Sy2−Ly2. Quadrature phase signals Sy2+Ly2 and Sy2−Ly2, which may correspond to quadrature phase signals $S_y+jL_y$ and $S_y-jL_y$ in FIG. 5B, may be provided to a pair of balanced opto-electrical converters, such as the pair 504D of balanced opto-electrical converters of FIG. 5B.

IV. Second Embodiment of a DP-QPSK Demodulator

Figure 7A:
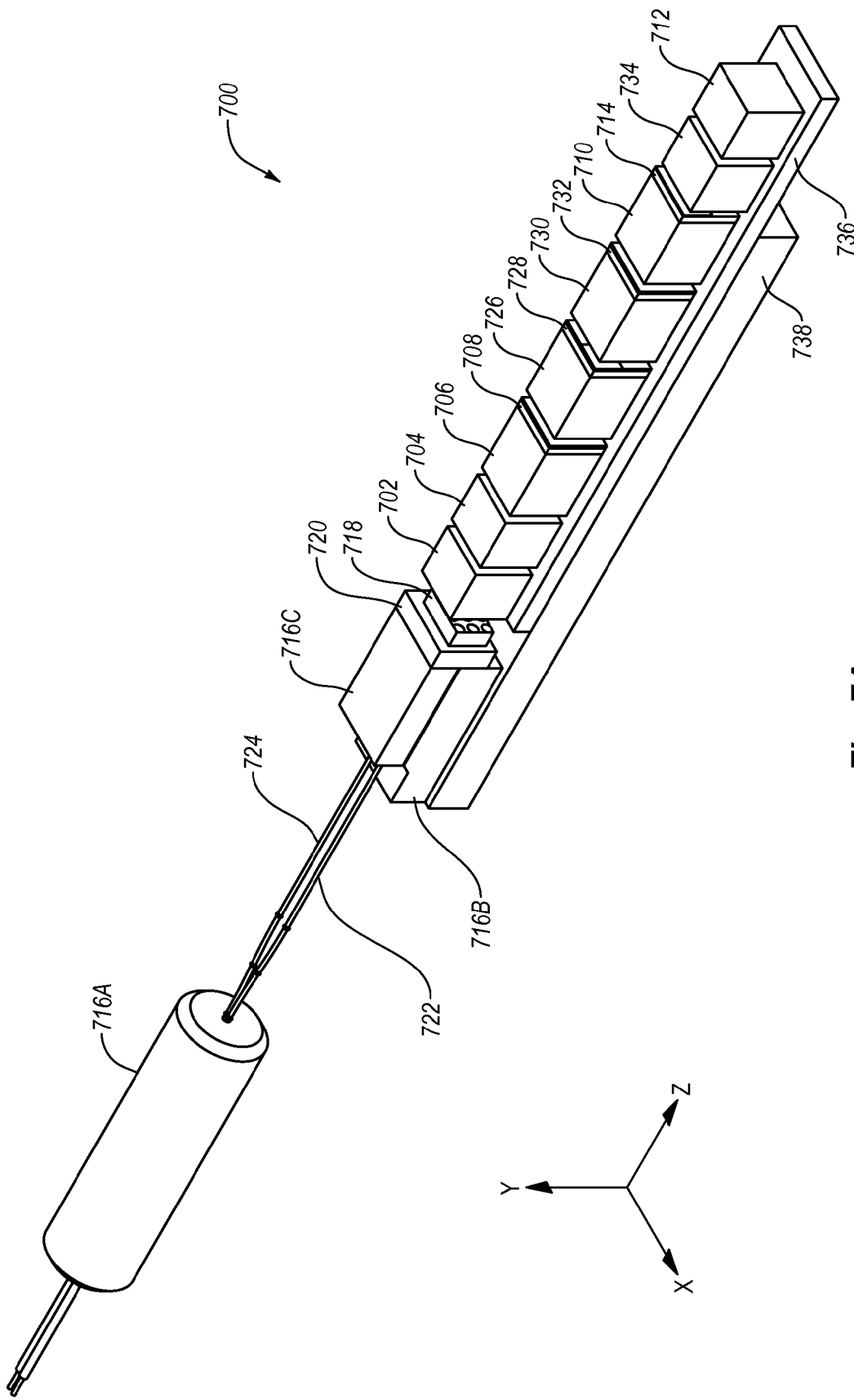
FIG. 7A illustrates a perspective view of another example DP-QPSK demodulator such as may be implemented in the transponder system of FIG. 1.
Figure 7D:
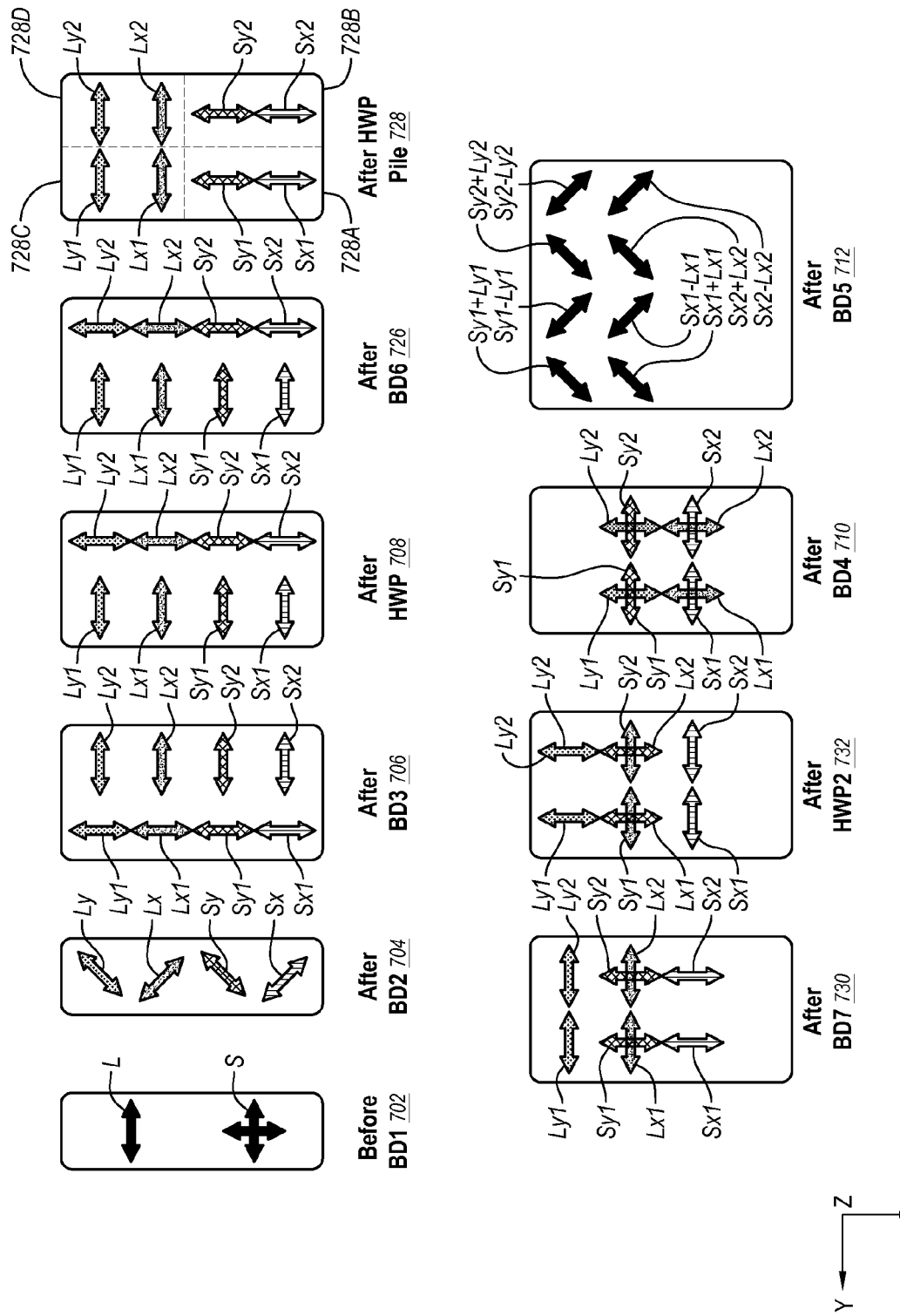
FIG. 7D illustrates various polarization states associated with various signals at various points during passage through the DP-QPSK demodulator of FIGS. 7B-7C.

Reference will next be made to FIGS. 7A-7D to describe a second example embodiment of a DP-QPSK demodulator 700. FIG. 7A illustrates a perspective view of the DP-QPSK demodulator 700 (hereinafter "demodulator 700"), which demodulator may be implemented in the transponder system 100 of FIG. 1 and/or the receive system 500 of FIGS. 5A-5B. For example, the demodulator 700 may correspond to the demodulator 122 of FIG. 1 or the demodulator 502 of FIGS. 5A-5B. FIG. 7B illustrates a top view of the demodulator 700 of FIG. 7A. FIG. 7C illustrates a side view of the demodulator 700 of FIG. 7A. FIG. 7D illustrates various polarization states associated with various signals at various points during passage through the demodulator 700 of FIGS. 7A-7C.

Similar to the demodulator 600, the demodulator 700 includes a first BD ("BD1" in FIGS. 7B-7D) 702, a second BD ("BD2" in FIGS. 7B-7D) 704, a third BD ("BD3" in FIGS. 7B-7D) 706, a HWP 708, a fourth BD ("BD4" in FIGS. 7B-7D) 710, a fifth BD ("BD5" in FIGS. 7B-7D) 712 and a quarter waveplate (QWP) 714. The second BD 704 is positioned to receive an output from the first BD 702. The third BD 706 is positioned to receive an output from the second BD 704. The HWP 708 is positioned to receive an output from the third BD 706 and in some embodiments may be coupled to the third BD 706. The fourth BD 710 is positioned to receive an output from the HWP 708, although additional intervening elements are illustrated in FIGS. 7A-7C that will be described in more detail below. The fifth BD 712 is positioned to receive an output from the fourth BD 710. The QWP 714 is positioned between the fourth BD 710 and the fifth BD 712.

FIG. 7A additionally includes a set of arbitrarily defined reference axes x, y, z to provide a frame of reference. The reference axes x, y, z are also provided in FIGS. 7B-7D as an aid in understanding the orientations of the views depicted in FIGS. 7B-7D with respect to the view of FIG. 7A.

Similar to the demodulator 600, the demodulator 700 may optionally further include various components 716A-716C that collectively form a fiber array with feedthrough (hereinafter "fiber array with feedthrough 716"). The fiber array with feedthrough 716 includes a feedthrough tube 716A, a V-groove alignment guide 716B, and a lid 716C. In some embodiments, a lens array 718 may be positioned between the fiber array with feedthrough 716 and the first BD 702, and a spacer 720 may be positioned between the fiber array with feedthrough 716 and the lens array 718. First and second optical fibers 722, 724 extending from the feedthrough tube 716A may respectively provide an input DP-QPSK optical signal S (hereinafter "optical signal S") and a local oscillator signal L (hereinafter "LO signal L"), both of which may be transmitted through the spacer 720 and the lens array 718 to the first BD 702. The first optical fiber 722 may include single mode (SM) fiber. The second optical fiber 724 may include polarization maintaining (PM) fiber. The fiber array with feedthrough 716, the spacer 720 and the lens array 718 may collectively form a collimator for the optical signal S and LO signal L received from the first and second optical fibers 722, 724.

As illustrated, the demodulator 700 further includes a sixth BD ("BD6" in FIGS. 7B-7D) 726, a HWP pile 728, a seventh BD ("BD7" in FIGS. 7B-7D) 730, a second HWP 732, and an eighth BD ("BD8" in FIGS. 7B-7D) 734. The sixth BD is positioned between the HWP 708 and the fourth BD 710. The HWP pile 728 is positioned between the sixth BD 726 and the fourth BD 710. The seventh BD 730 is positioned between the HWP pile 728 and the fourth BD 710. The second HWP 732 is positioned between the seventh BD 730 and the fourth BD 710. The eighth BD 734 is positioned between the QWP 714 and the fifth BD 712.

In some embodiments, each of the first BD 702, the second BD 704, the third BD 706, the fourth BD 710, the fifth BD 712, the sixth BD 726, the seventh BD 730 and the eight BD 734 may include, but is not limited to, Birefringent crystal such as YVO4.

Optionally, the demodulator 700 further includes a first substrate 736 and a second substrate 738. The HWP 708, QWP 714, HWP pile 728, second HWP 732, and first, second, third, fourth, fifth, sixth, seventh and eighth BDs 702, 704, 706, 710, 712, 726, 730 and 734 may be mounted on, formed on, or otherwise coupled to the first substrate 736. At least a portion of the feedthrough with fiber array 716 and the first substrate 736 may be mounted on, formed on, or otherwise coupled to the second substrate 738. Each of the first and second substrates 736, 738 may include, but is not limited to, fused silica or other suitable material(s).

As best seen in FIGS. 7B-7C, the optical signal S enters the first BD 702 followed by the second BD 704. The first and second BDs 702, 704 cooperate to divide the optical signal S into components Sx and Sy having orthogonal X and Y polarization states. Analogously, the LO signal L enters the first BD 702 followed by the second BD 704 and is divided into components Lx and Ly having orthogonal X and Y polarization states. The polarization states of the components Sx, Sy, Lx and Ly at the output of the second BD 704 are illustrated in FIG. 7D at "After BD2 704" and are labeled with the same labels "Sx", "Sy", "Lx" and "Ly" as the corresponding components Sx, Sy, Lx and Ly for convenience. In like manner, the polarization states of various optical signals or components and/or portions thereof at various locations of the demodulator 700 are labeled in FIG. 7D with the same labels as used to identify the corresponding optical signals or components and/or portions thereof.

A single one of the components Sx, Sy, Lx, Ly is visible in the side view of FIG. 7C at the output of the second BD 704. It is appreciated, however, with the benefit of the present disclosure, that all four of the components Sx, Sy, Lx, Ly exit the second BD 704 in a same plane that is substantially parallel to the x-z plane such that only one of the components Sx, Sy, Lx, Ly is visible at the output of the second BD 704 in the view of FIG. 7C. The component illustrated as exiting the second BD 704 has been labeled as "Sx, Sy, Lx, Ly" in FIG. 7C to indicate that all four components Sx, Sy, Lx, Ly exit the second BD 704 at about the same height in the y-direction, although generally spaced apart from each other in the x direction as illustrated in FIG. 7B.

A similar labeling convention has been used throughout FIGS. 7B and 7C where only one of multiple components or subcomponents is visible due to the orientation of the plane of the corresponding Figure with respect to a plane in which the multiple components or subcomponents are disposed, e.g., where the plane of the Figure is perpendicular to a plane in which the multiple components or subcomponents are disposed. In particular, wherever a component or subcomponent is labeled in FIG. 7B or 7C with a string of reference names (e.g., Sx, Sy, Lx, Ly, etc.) separated by commas, this indicates that the components or subcomponents identified by the comma-separated reference names are disposed in a plane that is substantially perpendicular to the x-z plane for FIG. 7B, or to the y-z plane for FIG. 7C.

With continued reference to FIGS. 7B-7D, the components Sx, Sy, Lx and Ly output by the second BD 704 enter the third BD 706. The third BD 706 is configured to split each of the components Sx, Sy, Lx and Ly into two orthogonally polarized subcomponents. Specifically, and with combined reference to FIGS. 7B-7D, the third BD 706 splits the component Sx into orthogonally polarized subcomponents Sx1 and Sx2; splits the component Sy into orthogonally polarized subcomponents Sy1 and Sy2; splits the component Lx into orthogonally polarized subcomponents Lx1 and Lx2; and splits the component Ly into orthogonally polarized subcomponents Ly1 and Ly2. Each of the components Sx, Sy, Lx, Ly thus exits the second BD 704 and enters the third BD 706 with the diagonal polarizations illustrated at "After BD2 704" in FIG. 7D, and is split into the two components Sx1 and Sx2, Sy1 and Sy2, Lx1 and Lx2, and Ly1 and Ly2 having vertical polarization (for Sx2, Sy2, Lx2 and Ly2) or horizontal polarization (for Sx1, Sy1, Lx1 and Ly1) as also illustrated in FIG. 7D at "After BD3 706".

In some embodiments, vertical polarization refers to polarization oriented in a direction substantially parallel to the y axis while horizontal polarization refers to polarization oriented in a direction substantially parallel to the x axis. Thus, notwithstanding the orientation of the polarizations of Sx2, Sy2, Lx2 and Ly2 in FIG. 7D being oriented side-to-side in the view of 7D, these polarizations are referred to as vertical polarizations insofar as they are substantially parallel to the y axis. Similarly, notwithstanding the orientation of the polarizations of Sx1, Sy1, Lx1 and Ly2 in FIG. 7D being oriented top-to-bottom in the view of 7D, these polarizations are referred to as horizontal polarizations insofar as they are substantially parallel to the x axis. Diagonal polarization refers to any polarization parallel to the x-y plane that is oriented at about plus or minus 45 degrees from a line parallel to the x axis.

The subcomponents Sx1, Sx2, Sy1, Sy2, Lx1, Lx2, Ly1 and Ly2 output by the third BD 706 are transmitted through the HWP 708. The HWP 708 may be oriented at about 45 degrees. The HWP 708 may be configured to rotate the polarizations of each of the subcomponents Sx1, Sx2, Sy1, Sy2, Lx1, Lx2, Ly1 and Ly2 by 90 degrees so that, at the output of the HWP 708, each of the subcomponents Sx2, Sy2, Lx2 and Ly2 has horizontal polarization while each of the subcomponents Sx1, Sy1, Lx1 and Ly1 has vertical polarization, as denoted at "After HWP 708" in FIG. 7D.

The subcomponents Sx1, Sx2, Sy1, Sy2, Lx1, Lx2, Ly1 and Ly2 output by the HWP 708 are transmitted through the sixth BD 726. As denoted at "After BD6 726" in FIG. 7D, the sixth BD 726 does not affect the polarizations of the subcomponents Sx1, Sx2, Sy1, Sy2, Lx1, Lx2, Ly1 and Ly2. As best seen in FIG. 7C, the sixth BD 726 is configured to increase the vertical separation, e.g., the distance in the y direction, between the subcomponents Sx1, Sy1, Lx1 and Ly1 and the respective subcomponents Sx2, Sy2, Lx2 and Ly2. The increase in vertical separation is not reflected in FIG. 7D.

The subcomponents Sx1, Sx2, Sy1, Sy2, Lx1, Lx2, Ly1 and Ly2 output by the sixth BD 726 are transmitted through the HWP pile 728. The HWP pile 708 may include, but is not limited to, quartz. The HWP pile 708 may have four portions, including a first portion 728A (FIG. 7D) through which subcomponents Sx1 and Sy1 are transmitted, a second portion 728B (FIG. 7D) through which subcomponents Sx2 and Sy2 are transmitted, a third portion 728C (FIG. 7D) through which subcomponents Lx1 and Ly1 are transmitted, and a fourth portion 728D (FIG. 7D) through which subcomponents Lx2 and Ly2 are transmitted. The first portion may be oriented at about_45_degrees, the second portion may be oriented at about 0 degrees, the third portion may be oriented at about 0 degrees, and the fourth portion may be oriented at about 45 degrees.

The first portion 728A may be configured to rotate the polarization of signals with vertical polarization, such as the subcomponents Sx1 and Sy1, to horizontal polarization. The second portion 728B may be configured to not rotate the polarization of signals with horizontal polarization, such as the subcomponents Sx2 and Sy2. The third portion 728C may be configured to not rotate the polarization of signals with vertical polarization, such as the subcomponents Lx1 and Ly1. The fourth portion 728D may be configured to rotate the polarization of signals with horizontal polarization, such as the subcomponents Lx2 and Ly2, to vertical polarization. The polarizations of the subcomponents Sx1, Sx2, Sy1, Sy2, Lx1, Lx2, Ly1 and Ly2 after passing through the various portions 728A-728D of the HWP pile 728 are denoted in FIG. 7D at "After HWP pile 728".

The subcomponents Sx1, Sx2, Sy1, Sy2, Lx1, Lx2, Ly1 and Ly2 output by the HWP pile 728 are transmitted through the seventh BD 730, the second HWP 732 and the fourth BD 710. The seventh BD 730 and the fourth BD 710 are configured to cooperate to pair each of the subcomponents Sx1, Sx2, Sy1, Sy2 of the optical signal S with a corresponding one of the subcomponents Lx1, Lx2, Ly1, Ly2 of the LO signal L such that an output of the fourth BD 710 includes four signal pairs, including a first signal pair Sx1/Lx1, a second signal pair Sx2/Lx2, a third signal pair Sy1/Ly1, and a fourth signal pair Sy2/Ly2.

In more detail, the seventh BD 730 redirects the signal path of each of the subcomponents Sx1, Sx2, Sy1, Sy2 so that Sy1 and Lx1 are on a same signal path at the output of the seventh BD 730, and Sy2 and Lx2 are also on a same signal path at the output of the seventh BD 730, as perhaps best seen in FIG. 7D. FIG. 7D additionally depicts the polarization states of the various subcomponents at the output of the seventh BD 730, as denoted at "After BD7 730". As illustrated in FIG. 7D, the seventh BD 730 does not affect the polarization of the subcomponents Sx1, Sx2, Sy1, Sy2, Lx1, Lx2, Ly1, Ly2 that pass therethrough.

As the subcomponents Sx1, Sx2, Sy1, Sy2, Lx1, Lx2, Ly1 and Ly2 are transmitted through the seventh BD 730, the second HWP 732 and the fourth BD 710, the polarization of each of the subcomponents Sx1, Sx2, Sy1, Sy2, Lx1, Lx2, Ly1 and Ly2 is altered by the second HWP 732. In particular, the second HWP 732 rotates the polarization of each of the subcomponents Sx1, Sx2, Sy1, Sy2, Lx1, Lx2, Ly1 and Ly2 such that, at the output of the second HWP 732, the subcomponents Sx1, Sx2, Sy1, Sy2 have vertical polarization, and the subcomponents Lx1, Lx2, Ly1, Ly2 have horizontal polarization, as denoted at "After HWP2 732" in FIG. 7D. The second HWP 732 is oriented at about 45 degrees in some embodiments.

The fourth BD 710 redirects the signal path of each of the subcomponents Lx1, Lx2, Ly1, Ly2 so that Sx1 and Lx1 are paired (e.g., are on the same signal path), Sx2 and Lx2 are paired, Sy1 and Ly1 are paired, and Sy2 and Ly2 are paired. FIG. 7D illustrates the polarization states of the various subcomponents at the output of the fourth BD 710, as denoted at "After BD4 710". As illustrated in FIG. 7D, the fourth BD 710 does not affect the polarization of the subcomponents Sx1, Sx2, Sy1, Sy2, Lx1, Lx2, Ly1, Ly2 that pass therethrough.

FIG. 7D further illustrates that, as the various subcomponents are transmitted through the seventh BD 730, the second HWP 732 and the fourth BD 710, the subcomponents Sx1, Sx2, Sy1, Sy2 generally have a polarization that is orthogonal to the polarization of the subcomponents Lx1, Lx2, Ly1, Ly2. As such, the subcomponents Sx1, Sx2, Sy1, Sy2 do not generally interfere with the corresponding subcomponents Lx1, Lx2, Ly1, Ly2 with which signal paths are shared at any stage as the various subcomponents are transmitted through the seventh BD 730, the second HWP 732 and the fourth BD 710.

After the fourth BD 710, the second signal pair Sx2/Lx2 passes through the QWP 714. The fourth signal pair Sy2/Ly2 also passes through the QWP 714, whereas the first signal pair Sx1/Lx1 and the third signal pair Sy1/Ly1 do not. In at least some example embodiments, the QWP 714 is oriented at about 0 degrees. Accordingly, the QWP 714 may be configured to introduce a 90 degree phase difference between the first signal pair Sx1/Lx1 and the second signal pair Sx2/Lx2, and may be further configured to introduce a 90 degree phase difference between the third signal pair Sy1/Ly1 and the fourth signal pair Sy2/Ly2.

Next, the signal pairs Sx1/Lx1, Sx2/Lx2, Sy1/Ly1, and Sy2/Ly2 are transmitted through the eighth BD 734 and the fifth BD 712. The eighth BD 734 and the fifth BD 712 cooperate to divide the subcomponent Sx1 into first and second portions on separate signal paths having diagonal polarizations that are orthogonal to each other. The first and second portions of the subcomponent Sx1 may have substantially equal power in some embodiments. Similarly, the eighth BD 734 and the fifth BD 712 cooperate to divide the subcomponent Lx1 traveling on the same signal path as the subcomponent Sx1 into first and second portions having diagonal polarizations that are orthogonal to each other. The first and second portions of the subcomponent Lx1 travel on the same separate signal paths as the first and second portions of the subcomponent Sx1 and may have substantially equal power in some embodiments.

The first portion of the subcomponent Sx1 may constructively interfere in the eighth BD 734 and/or the fifth BD 712 with the first portion of the subcomponent Lx 1 traveling on the same signal path as the first portion of the subcomponent Sx1 to produce in-phase signal Sx1+Lx1. The second portion of the subcomponent Sx1 may destructively interfere in the eighth BD 734 and/or the fifth BD 712 with the second portion of the subcomponent Lx1 traveling on the same signal path as the second portion of the subcomponent Sx1 to produce in-phase signal Sx1−Lx1. In-phase signals Sx1+Lx1 and Sx1−Lx1, which may correspond to in-phase signals $S_x+L_x$ and $S_x-L_x$ in FIG. 5B, may be provided to a pair of balanced opto-electrical converters, such as the pair 504A of balanced opto-electrical converters of FIG. 5B.

In an analogous manner, the eighth BD 734 and the fifth BD 712 cooperate to divide each of the subcomponents Sx2, Sy1 and Sy2 into two portions having diagonal polarizations that are orthogonal to each other and are on separate signal paths. The eighth BD 734 and the fifth BD 712 also cooperate to divide each of the subcomponents Lx2, Ly1 and Ly2 into two components having diagonal polarizations that are orthogonal to each other and are on the same separate signal paths, respectively, as the corresponding portions of subcomponents Sx2, Sy1 and Sy2. Then the portions of the subcomponents Sx2, Sy1 and Sy2 constructively and destructively interfere with the respective portions of the subcomponents Lx2, Ly1 and Ly2 traveling on the same signal paths in the eighth BD 734 and/or the fifth BD 712.

In particular, a first portion of the subcomponent Sx2 may constructively interfere with a first portion of the subcomponent Lx2 traveling on the same signal path as the first portion of the subcomponent Sx2 to produce quadrature phase signal Sx2+Lx2. Additionally, a second portion of the subcomponent Sx2 may destructively interfere with a second portion of the subcomponent Lx2 traveling on the same signal path as the second portion of the subcomponent Sx2 to produce quadrature phase signal Sx2−Lx2. Quadrature phase signals Sx2+Lx2 and Sx2−Lx2, which may correspond to quadrature phase signals $S_x+jL_x$ and $S_x-jL_x$ in FIG. 5B, may be provided to a pair of balanced opto-electrical converters, such as the pair 504B of balanced opto-electrical converters of FIG. 5B.

Analogously, a first portion of the subcomponent Sy1 may constructively interfere with a first portion of the subcomponent Ly1 traveling on the same signal path as the first portion of the subcomponent Sy1 to produce in-phase signal Sy1+Ly1. Additionally, a second portion of the subcomponent Sy1 may destructively interfere with a second portion of the subcomponent Ly1 traveling on the same signal path as the second portion of the subcomponent Sy1 to produce in-phase signal Sy1−Ly1. In-phase signals Sy1+Ly1 and Sy1−Ly1, which may correspond to in-phase signals $S_y+L_y$ and $S_y-L_y$ in FIG. 5B, may be provided to a pair of balanced opto-electrical converters, such as the pair 504C of balanced opto-electrical converters of FIG. 5B.

Analogously, a first portion of the subcomponent Sy2 may constructively interfere with a first portion of the subcomponent Ly2 traveling on the same signal path as the first portion of the subcomponent Sy2 to produce quadrature phase signal Sy2+Ly2. Additionally, a second portion of the subcomponent Sy2 may destructively interfere with a second portion of the subcomponent Ly2 traveling on the same signal path as the second portion of the subcomponent Sy2 to produce quadrature phase signal Sy2−Ly2. Quadrature phase signals Sy2+Ly2 and Sy2−Ly2, which may correspond to quadrature phase signals $S_y+jL_y$ and $S_y-jL_y$ in FIG. 5B, may be provided to a pair of balanced opto-electrical converters, such as the pair 504D of balanced opto-electrical converters of FIG. 5B.

Although the demodulator 700 of FIGS. 7A-7C is illustrated as including both the eighth BD 734 and the fifth BD 712 following the QWP 714, in other embodiments the eighth BD 734 and the fifth BD 712 may be replaced by a single BD, such as the fifth BD 612 of FIGS. 6A-6C. Alternately or additionally, each of the demodulators 600, 700 may be implemented as a completely passive demodulator.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A demodulator comprising:
   a first beam displacer;
   a second beam displacer positioned to receive an output from the first beam displacer;
   a third beam displacer positioned to receive an output from the second beam displacer;
   a first half waveplate positioned to receive an output from the third beam displacer;
   a fourth beam displacer positioned to receive an output from the first half waveplate;
   a fifth beam displacer positioned to receive an output from the fourth beam displacer;
   a quarter waveplate positioned between the fourth beam displacer and the fifth beam displacer;
   a sixth beam displacer positioned between the first half waveplate and the fourth beam displacer;
   a half waveplate pile positioned between the sixth beam displacer and the fourth beam displacer;
   a seventh beam displacer positioned between the half waveplate pile and the fourth beam displacer; and
   a second half waveplate positioned between the seventh beam displacer and the fourth beam displacer.

2. The demodulator of claim 1, wherein the half waveplate pile comprises four portions, including a first portion oriented at about 45 degrees, a second portion oriented at about 0 degrees, a third portion oriented at about 0 degrees, and a fourth portion oriented at about 45 degrees.

3. The demodulator of claim 1, wherein the first half waveplate is coupled to the third beam displacer.

4. The demodulator of claim 1, wherein:
   the first beam displacer is configured to receive as input an optical signal S and a local oscillator signal L;
   the output from the second beam displacer comprises two orthogonally polarized components Sx and Sy of the optical signal S and two orthogonally polarized components Lx and Ly of the local oscillator signal L;
   the output from the third beam displacer comprises first and second subcomponents Sx1 and Sx2 of the component Sx, first and second subcomponents Sy1 and Sy2 of the component Sy, first and second subcomponents Lx1 and Lx2 of the component Lx, and first and second subcomponents Ly1 and Ly2 of the component Ly;
   the output from the fourth beam displacer comprises:
      a first signal pair including the first subcomponent Sx1 and the first subcomponent Lx1;
      a second signal pair including the second subcomponent Sx2 and the second subcomponent Lx2;
      a third signal pair including the first subcomponent Sy1 and the first subcomponent Ly1; and
      a fourth signal pair including the second subcomponent Sy2 and the second subcomponent Ly2; and
   the quarter waveplate is configured to produce a 90 degree phase difference between the first signal pair and the second signal pair and is further configured to produce a 90 degree phase difference between the third signal pair and the fourth signal pair.

5. The demodulator of claim 1, further comprising an eighth beam displacer positioned between the quarter waveplate and the fifth beam displacer.

6. The demodulator of claim 1, wherein the second half waveplate is oriented at about 45 degrees.

7. The demodulator of claim 1, wherein the half waveplate pile comprises quartz.

8. The demodulator of claim 1, further comprising:
   a fiber array with feedthrough;
   a lens array positioned between the fiber array with feedthrough and the first beam displacer;
   a spacer positioned between the fiber array with feedthrough and the lens array;
   a first substrate on which the first half waveplate, the quarter waveplate, the half waveplate pile, the second half waveplate, and the first, second, third, fourth, fifth, sixth, and seventh beam displacers are mounted; and
   a second substrate on which a portion of the fiber array with feedthrough and the first substrate are mounted.

9. The demodulator of claim 1, wherein the demodulator is a completely passive demodulator.

10. An optical receiver comprising:
    the demodulator of claim 1; and
    four pairs of balanced opto-electrical converters positioned to receive eight optical signals output by the fifth beam displacer.

11. An optoelectronic module comprising:
    a dual-polarization quadrature phase shift keyed (DP-QPSK) demodulator including:
       a first beam displacer;
       a second beam displacer positioned to receive an output from the first beam displacer;
       a third beam displacer positioned to receive an output from the second beam displacer;
       a first half waveplate positioned to receive an output from the third beam displacer;
       a fourth beam displacer positioned to receive an output from the half waveplate;
       a fifth beam displacer positioned to receive an output from the fourth beam displacer;
       a quarter waveplate positioned between the fourth beam displacer and the fifth beam displacer;
       a sixth beam displacer positioned between the first half waveplate and the fourth beam displacer;
       a half waveplate pile positioned between the sixth beam displacer and the fourth beam displacer;
       a seventh beam displacer positioned between the half waveplate pile and the fourth beam displacer; and
       a second half waveplate positioned between the seventh beam displacer and the fourth beam displacer;
    a plurality of optical detectors positioned to receive a plurality of optical signals output by the DP-QPSK demodulator and configured to convert the plurality of optical signals to a plurality of electrical signals; and
    a digital signal processor electrically coupled to respective outputs of the plurality of optical detectors.

12. The optoelectronic module of claim 11, wherein the plurality of optical detectors comprise a plurality of pairs of balanced opto-electrical converters.

13. The optoelectronic module of claim 11, wherein the DP-QPSK demodulator further comprises an eighth beam displacer positioned between the quarter waveplate and the fifth beam displacer.

14. The optoelectronic module of claim 11, wherein the half waveplate pile comprises four portions, including a first portion oriented at about 45 degrees, a second portion oriented at about 0 degrees, a third portion oriented at about 0 degrees, and a fourth portion oriented at about 45 degrees.

15. The optoelectronic module of claim 11, wherein:
the first beam displacer is configured to receive as input an optical signal S and a local oscillator signal L;
the output from the second beam displacer comprises two orthogonally polarized components Sx and Sy of the optical signal S and two orthogonally polarized components Lx and Ly of the local oscillator signal L;
the output from the third beam displacer comprises first and second subcomponents Sx1 and Sx2 of the component Sx, first and second subcomponents Sy1 and Sy2 of the component Sy, first and second subcomponents Lx1 and Lx2 of the component Lx, and first and second subcomponents Ly1 and Ly2 of the component Ly;
the output from the fourth beam displacer comprises:
a first signal pair including the first subcomponent Sx1 and the first subcomponent Lx1;
a second signal pair including the second subcomponent Sx2 and the second subcomponent Lx2;
a third signal pair including the first subcomponent Sy1 and the first subcomponent Ly1; and
a fourth signal pair including the second subcomponent Sy2 and the second subcomponent Ly2; and
the quarter waveplate is configured to produce a 90 degree phase difference between the first signal pair and the second signal pair and is further configured to produce a 90 degree phase difference between the third signal pair and the fourth signal pair.

16. The optoelectronic module of claim 11, wherein the second half waveplate is oriented at about 45 degrees.

17. The optoelectronic module of claim 11, wherein the half waveplate pile comprises quartz.

18. The optoelectronic module of claim 11, further comprising:
a fiber array with feedthrough;
a lens array positioned between the fiber array with feedthrough and the first beam displacer;
a spacer positioned between the fiber array with feedthrough and the lens array;
a first substrate on which the first half waveplate, the quarter waveplate, the half waveplate pile, the second half waveplate, and the first, second, third, fourth, fifth, sixth, and seventh beam displacers are mounted; and
a second substrate on which a portion of the fiber array with feedthrough and the first substrate are mounted.

19. The optoelectronic module of claim 11, wherein the demodulator is a completely passive demodulator.

* * * * *